(12) United States Patent
Koester

(10) Patent No.: US 11,235,793 B1
(45) Date of Patent: Feb. 1, 2022

(54) CHECK LIST STAND FOR USE IN HEALTH CARE SETTINGS SUCH AS CLEANING SUPPLY CARTS FOR HOSPITAL ENVIRONMENTS AND CLEANING CARTS FOR THE SAME

(71) Applicant: The Tuway American Group, Inc., Troy, MI (US)

(72) Inventor: Douglas Koester, Troy, MI (US)

(73) Assignee: The Tuway American Group, Inc., Troy, MI (US)

( * ) Notice: Subject to any disclaimer, the term of this patent is extended or adjusted under 35 U.S.C. 154(b) by 0 days.

(21) Appl. No.: 16/133,302

(22) Filed: Sep. 17, 2018

Related U.S. Application Data

(60) Provisional application No. 62/559,546, filed on Sep. 16, 2017, provisional application No. 62/559,601, filed on Sep. 17, 2017.

(51) Int. Cl.
| | | |
|---|---|---|
| *B62B 3/10* | (2006.01) | |
| *A47B 23/06* | (2006.01) | |
| *A47B 31/00* | (2006.01) | |
| *B62B 3/00* | (2006.01) | |
| *B62B 5/00* | (2006.01) | |
| *B62B 3/02* | (2006.01) | |

(52) U.S. Cl.
CPC ............... *B62B 3/10* (2013.01); *A47B 23/06* (2013.01); *A47B 31/00* (2013.01); *B62B 3/004* (2013.01); *B62B 3/02* (2013.01); *B62B 3/104* (2013.01); *B62B 5/00* (2013.01); *A47B 2031/003* (2013.01); *B62B 3/106* (2013.01)

(58) Field of Classification Search
CPC .. B62B 3/10; B62B 5/00; B62B 3/104; B62B 3/02; B62B 3/004; B62B 3/106; A47B 31/00; A47B 23/06; A47B 2031/003
See application file for complete search history.

(56) References Cited

U.S. PATENT DOCUMENTS

| | | | |
|---|---|---|---|
| 2,905,480 A | 9/1959 | Gionanelli | |
| 3,573,879 A | 4/1971 | Bergkamp | |
| 3,951,486 A * | 4/1976 | Tracy | B60R 7/043 312/235.8 |
| 4,105,182 A * | 8/1978 | Jacobson | A47B 23/044 211/42 |
| 4,632,471 A * | 12/1986 | Visnapuu | A47B 21/045 248/442.2 |
| 4,743,040 A | 5/1988 | Brevegilieri | |
| 5,326,117 A | 7/1994 | Cook | |
| 5,613,791 A * | 3/1997 | Medenica | B42F 15/0058 402/4 |
| 6,367,642 B2 * | 4/2002 | Kambouris | B65D 43/164 206/701 |
| 6,497,423 B1 | 12/2002 | Percelli | |
| 6,827,357 B2 | 12/2004 | Calmeise | |
| D550,769 S * | 9/2007 | Pollard | D19/26 |
| 7,469,871 B2 * | 12/2008 | Cooper | A47B 31/06 224/276 |

(Continued)

*Primary Examiner* — Jacob B Meyer
(74) *Attorney, Agent, or Firm* — Young Basile Hanlon & MacFarlane, P.C.

(57) ABSTRACT

A moveable service cart for transporting cleaning tools and equipment is disclosed. Also disclosed is a service desk that can be employed with the moveable service cart or independently thereof.

16 Claims, 38 Drawing Sheets

(56) References Cited

U.S. PATENT DOCUMENTS

| | | | | |
|---|---|---|---|---|
| 7,673,908 | B2* | 3/2010 | Liptan | B42F 9/001 281/45 |
| 9,089,885 | B2 | 7/2015 | Taylor | |
| 9,216,751 | B2 | 12/2015 | Adams | |
| 9,545,936 | B2 | 1/2017 | Adams | |
| 9,827,807 | B2* | 11/2017 | Cooper | B42F 9/002 |
| 9,932,056 | B2 | 4/2018 | Eisenhut | |
| 10,034,594 | B2 | 7/2018 | Menzel | |
| 10,471,766 | B2* | 11/2019 | Cooper | G06F 1/1632 |
| 2001/0000901 | A1* | 5/2001 | Kambouris | B65D 43/164 220/212 |
| 2002/0145280 | A1* | 10/2002 | Bock | B42F 9/002 281/15.1 |
| 2003/0106979 | A1* | 6/2003 | Richardson | A47B 97/08 248/460 |
| 2004/0113036 | A1* | 6/2004 | Gilbert | B42F 9/001 248/346.01 |
| 2007/0187565 | A1* | 8/2007 | Liptan | B42F 9/001 248/456 |
| 2010/0129779 | A1* | 5/2010 | Pomerleau | G09B 11/06 434/88 |

* cited by examiner

CHECK LIST STAND FOR USE IN HEALTH CARE SETTINGS SUCH AS CLEANING SUPPLY CARTS FOR HOSPITAL ENVIRONMENTS AND CLEANING CARTS FOR THE SAME

The application is a non-provisional application that claims priority to Provisional Application Ser. No. 62/559,546 filed Sep. 16, 2017 and Provisional Application Ser. No. 62/559,601 filed Sep. 17, 2017, the specifications of which are incorporated in their entirety herein.

TECHNICAL FIELD

This disclosure relates to check list stands for use in health care settings including but not limited to service carts for janitorial operations. More particularly this disclosure is directed to service desks that can be removably connected to service carts for use in environments requiring high sanitation such as hospital operating rooms, other hospital locations, industrial clean rooms, and the like. This disclosure is also related to service carts for janitorial operations. More particularly is directed to service cats for use in environments requiring high sanitation such as hospital operating rooms, other hospital locations, industrial clean rooms, and the like.

BACKGROUND

The need for speed and/or efficiency in cleaning operations, particularly cleaning operations associated with health care settings requiring quick turn-around such as operating rooms, emergency rooms cannot be underestimated. It is also important the such cleaning be accomplished in a manner that maintains cleaning standards, and permits biohazard-contaminated material to be handled and disposed of in a manner that is safe for both the worker doing the cleaning and all involved the disposal of such materials.

Heretofore various devices have been proposed for accomplishing one or more tasks necessary for cleaning and sanitizing hospital areas such as operating rooms, emergency rooms and the like. to complete the necessary sanitizing tasks, the worker or workers tasked with sanitizing typically must assemble multiple cleaning tools and materials and transport them to the desired site. Additionally, the hospital, the various cleaning tools and materials must be deployed in a manner that prevents or minimizes cross contamination from site to site.

The need to document compliance with cleaning operations associated with cleaning and sanitizing various discrete locations in hospital settings as well as consulting instructions and using various other interactive devices is also important. It is contemplated that various stand-alone desks that can be moveably connected to other supply carts and the like that are sanitary and transportable are important.

While various service desks and service cart configurations have been proposed for transporting cleaning material and supplied to cleaning sites in general, very little has been proposed to address the specific needs and issues relating to site cleaning in a hospital setting, particularly at locations such as operating rooms and emergency room. It would be desirable to provide transport carts that could be deployed and employed to permit more effective cleaning and sanitizing in hospital sites.

SUMMARY

Disclosed herein is a moveable service cart for transporting cleaning tools and equipment. The moveable service cart includes A base member, at least two wheel mechanisms, and a central storage member. The base member has a length and a width with the width being less than the length. The base member has an upwardly oriented face and a downwardly oriented face when the moveable cart is in the use position. The wheel mechanisms are connected to the base member and project downward from the downwardly oriented face. The central storage housing is connected to the base and has a central storage housing width that is equal to or less that the base member width and a central storage housing length that is less than the base member length and a central storage housing height that is equal to or greater than width of the base member. The central storage housing defines a central storage cavity and has a top face parallel to the base member, a rear wall and opposed side walls and at least one access door. The access door opposed to the rear wall and moveable between a closed position and at least one open position. The central storage housing has at least one equipment receptacle defined in the access door projecting into the central cavity when the access door is in a closed position and at least one equipment receptacle defined in the central storage cavity.

Also disclosed is a service desk assembly that includes a planar body having an outwardly oriented face and an opposed inwardly oriented face, the planar body having an upper edge and an opposed lower edge, the lower edge having a lower ledge member contiguously joined to the planar body at a location proximate to the lower edge and projecting angularly outward from the outwardly oriented face, the planar body having a planar body length $P_L$, a rear support having a first end and an opposed second end, the first end of the rear support pivotally connected to the upper edge of the of the planar body, the real support having length $R_L$, wherein $R_L$ is equal to or less than $P_L$: and at least one central folding strut having a first end and an opposed second end, the first end of the central folding strut that is foldably mounted on either the rear support or the inwardly oriented face of the planar body at a central location, the opposed second end, the second end having at least one engagement member defined thereon, the engagement member configured to releasably contact either the inwardly oriented face of the planar member or the central folding strut.

BRIEF DESCRIPTION OF THE DRAWINGS

The disclosure is best understood from the following detailed description when read in conjunction with the accompanying drawings in which like reference numerals depict like elements through the various drawing figures.

FIG. 21 B is a detail view of the device of FIG. 21A;

and

Figure 36:
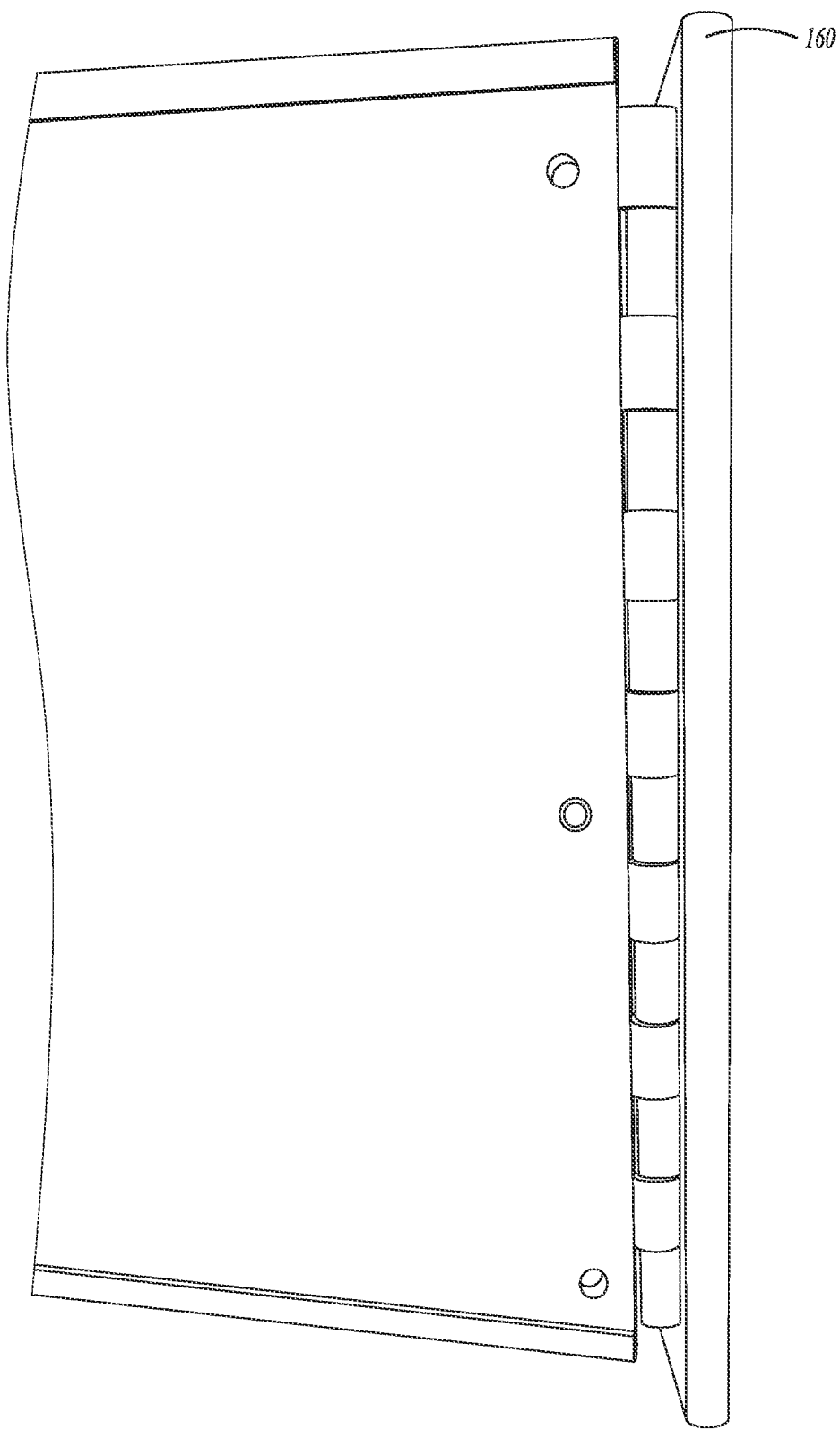

FIG. 36 is a detail of an embodiment of the hinge member employed herein.

DETAILED DESCRIPTION

Disclosed is a moveable service cart 10 that includes a base member 12, at least two wheel mechanisms 14, 16 connected to the base member 12 and a central storage housing 18 connected to the base member 12.

In the use position, the base member 12 has a downwardly oriented face 20 that is paralleled to and positioned a spaced distance from the support surface on which the moveable service cart 10 is located. The base member 12 also has an upwardly oriented face 22 that is generally parallel to the downwardly oriented face 20 in most embodiments. In certain embodiments such as that shown in FIG. 1, the base member 12 can have an elongated planar configuration such as a generally rectangular configuration with a length L that is greater than width W by at least between 5 and 25%.

The central storage housing is connected to the upwardly oriented face 22 of the base member 12. The wheel mechanisms 14, 16 are connected to the downwardly oriented face 20 and project outward therefrom. The wheel mechanisms will be configured to provide for lateral movement of the moveable service cart 10 and contribute to the stability of the moveable service cart 10. One or more of the wheel mechanisms can include pivotal mounting mechanisms as desired or required. The moveable service cart 10 will include sufficient wheel mechanisms 14, 16 to maintain the stability of the moveable service cart 10. In certain embodiments, it is contemplated that the moveable service cart 10 will have at least two wheel mechanisms.

The central storage housing 18 can be connected to the base member 12 by any suitable means as by welding rivets and the like. The central storage housing 18 has a central storage housing width $W_H$ that is equal to or less than the width W of the base member 12 and a length $L_H$ that is less than the length L of the base member 12. In certain embodiments, the length $L_H$ will be between 10% and 50% of the Length L of the base member 12. In certain embodiments, width $W_H$ and length $L_H$ of the central storage housing 18 can be equal and the central storage housing 18 can have a height $H_H$ that is between 2 feet and 5 feet in certain embodiments.

Figure 4:
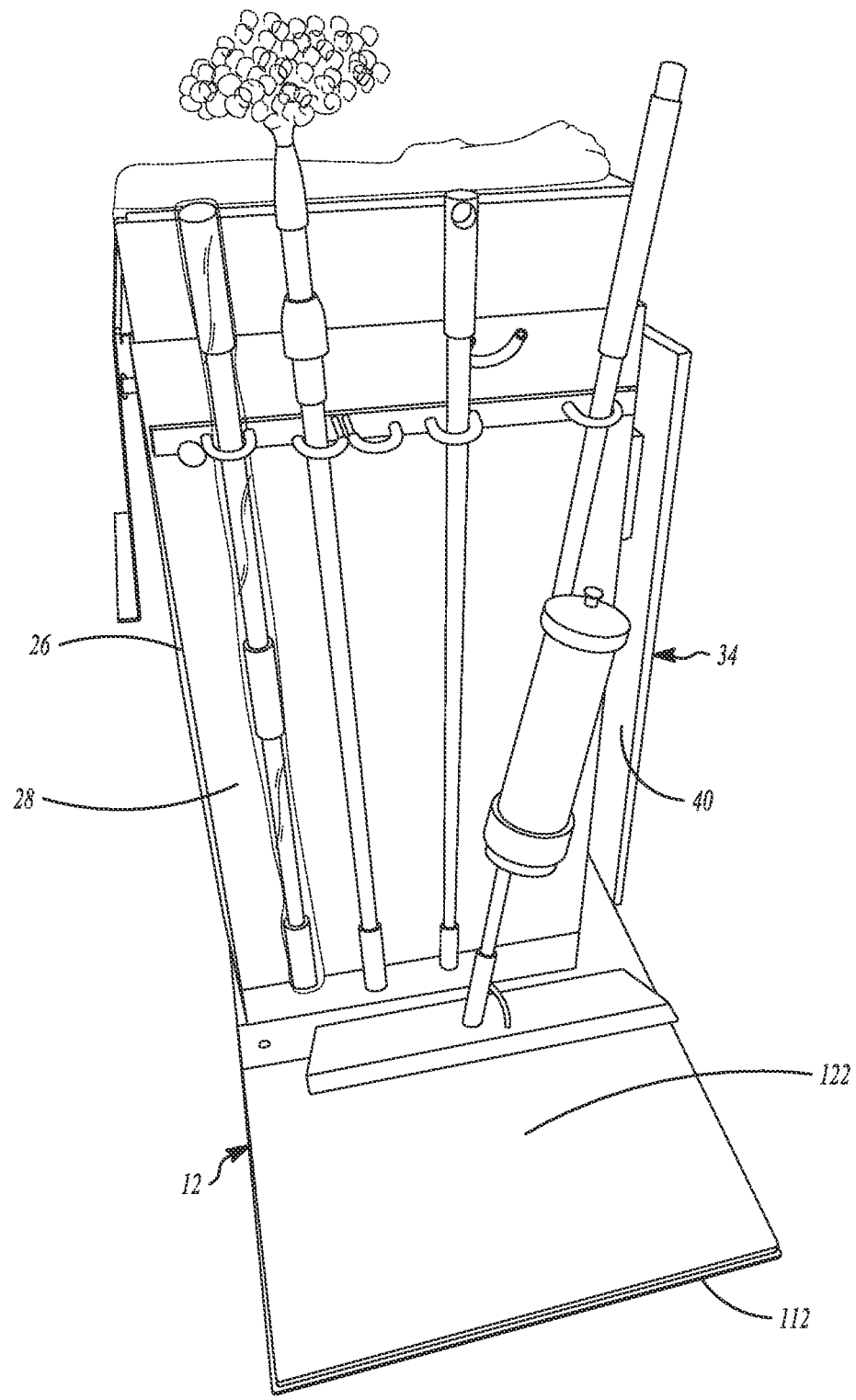
FIG. 4 is a detail of the side view of FIG. 3A with the associated mop bucket removed.
Figure 7:
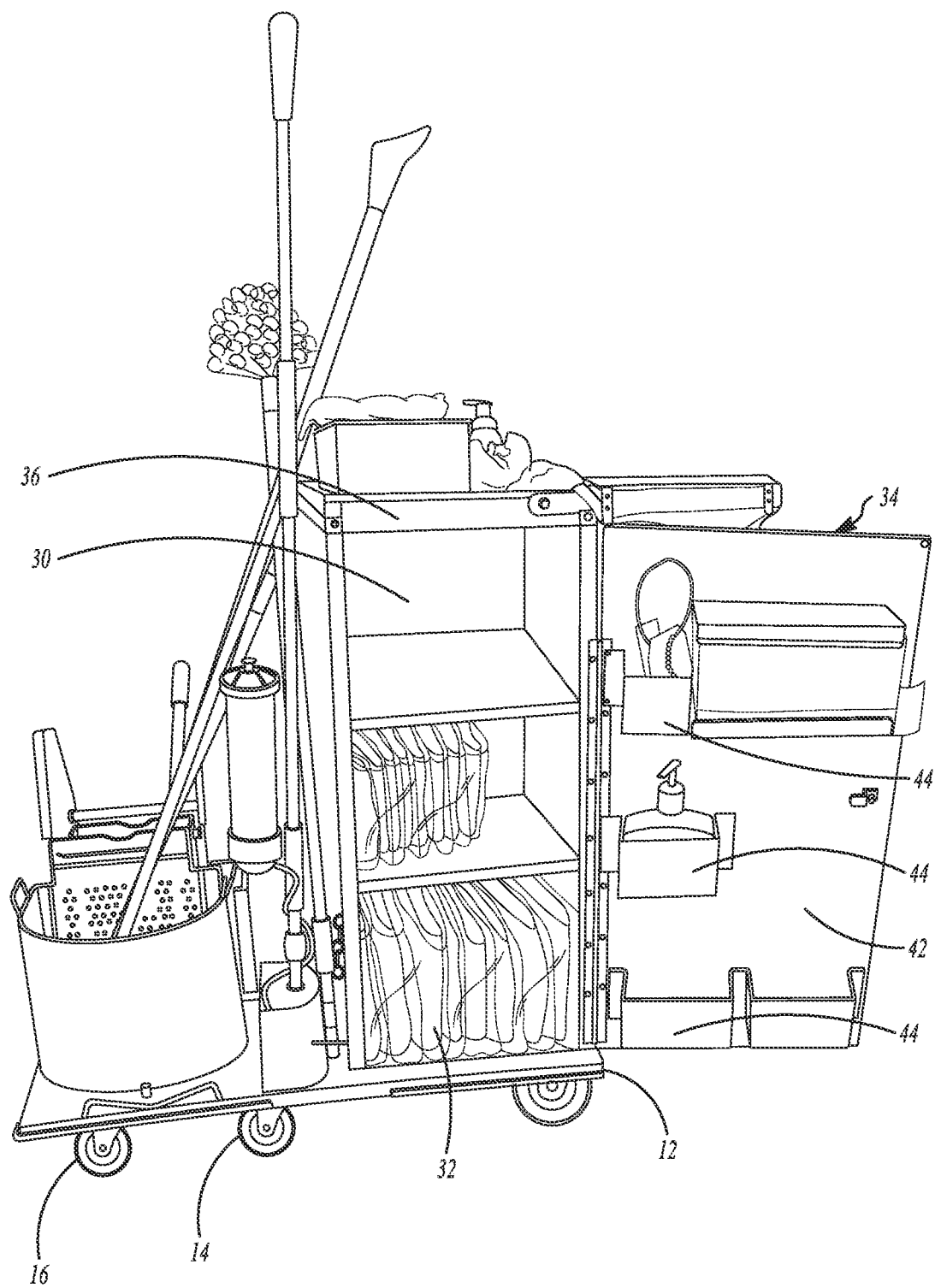
FIG. 7 is the front view of FIG. 1 with the storage panel door in the open position.

The central storage housing 18 can be rectangular in shape if desired or required and can have a top face member 24 that is parallel to the base member 12, a rear wall member 26 (shown in FIG. 4), a forward side wall 28 and rearward side wall 30 (shown in FIGS. 7 and 15) that, together with that define central storage cavity 32 (shown in FIG. 7).

Figure 9:
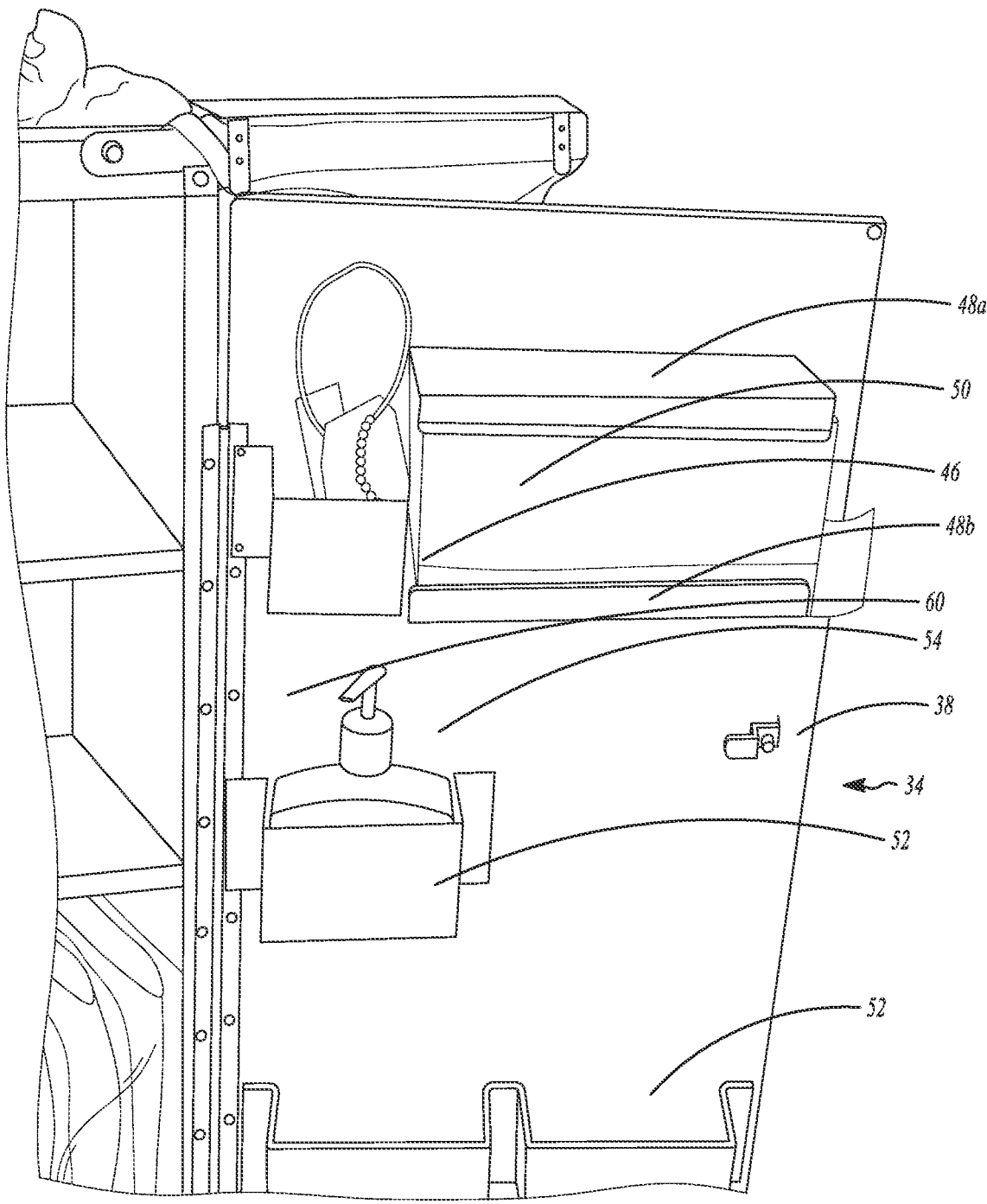
FIG. 9 is a detail view of an embodiment of the interior of the access door of FIG. 1.

The central storage housing 18 also includes at least one access door 34 that is mounted to one of the housing members and is moveable between a closed position and at least one open position. In the embodiment depicted in the drawing figures, the access door 34 is pivotally mounted to the rearward side wall 30 to maintain the access door 34 in a relation parallel to the rear wall member 26 when the access door in in the closed position. The access door 34 can include a suitable latch mechanism 38 to maintain the access door 34 in a closed position and to permit access into the central storage cavity 32 when desired or required. Pivotal mounting can be accomplished by various mechanisms. In the embodiment depicted in the various drawing figures, the pivotal mounting mechanism can be a piano hinge 60 connected to the access door 34 and a side face of the rear wall member 26 as seen in FIG. 9.

The central storage cavity 32 has at least one equipment receptacle that is configured to receive at least one item necessary for the desired cleaning operations. In the embodiment depicted in the drawing figures, the central storage cavity 36 includes at least one fixed shelf 36a connected to the forward side wall 28 and the rearward side wall 30 hat bisects the central storage cavity 32 at a position in the lower portion of the central storage cavity between the mid-point and the base member 12 to define he at least one receptacle in the lower portion of the central storage cavity 32. In certain embodiments, the at least one fixed shelf 36a is positioned in the lower third of the central storage cavity 32. The central storage cavity 32 can also include at least one shelf 36b that is positioned at a location between midpoint and the top face member 24 to define an upper storage receptacle.

The storage receptacle(s) can be dimensioned to received specific cleaning devices or supplies if desired or required. In the embodiment depicted in FIG. 1, a lower receptacle is configured to receive a plurality of disposable single-use mop bundle packages in an orderly side-by-side relationship, an intermediate receptacle can be configured to receive cleaning components such as non-woven wipes and single use vertical surface washing pads. And an upper receptacle can be configured to receive other job specific items.

The access door 34 of the moveable service cart 10 has an outwardly oriented face 40 and an opposed inwardly oriented face 42. The access door 34 as disclosed herein also includes at least one door-mounted equipment receptacle 44 defined in the access door projecting into the central cavity when the access door 34 is in a closed position. In the embodiment depicted, three door-mounted equipment receptacles 44 are positioned on the inwardly oriented face 42 in a manner that permits one door mounted equipment receptacle 44 to be received in a corresponding receptacle defined in the central storage cavity 32 defined in the central storage housing 18.

Non-limiting examples of suitable receptacles that are mounted in the inwardly oriented face 42 of access door 34 include an interiorly oriented electronics device 46, a pair of apposed slats 48a and 48b into which a device such as a glove dispenser 50 can be removably inserted. Also included is a receptacle 52 that is configured to removably receive a suitable hand sanitizer dispenser 54.

The access door 34 can also include a lower equipment receptacle configured as disposal bag dispenser receptacle 56 that is configured to discretely dispense waste collection bags 115 of various sizes or end use configurations. One embodiment of the disposal bag dispenser receptacle 56 is depicted in FIG. 11.

Figure 11:
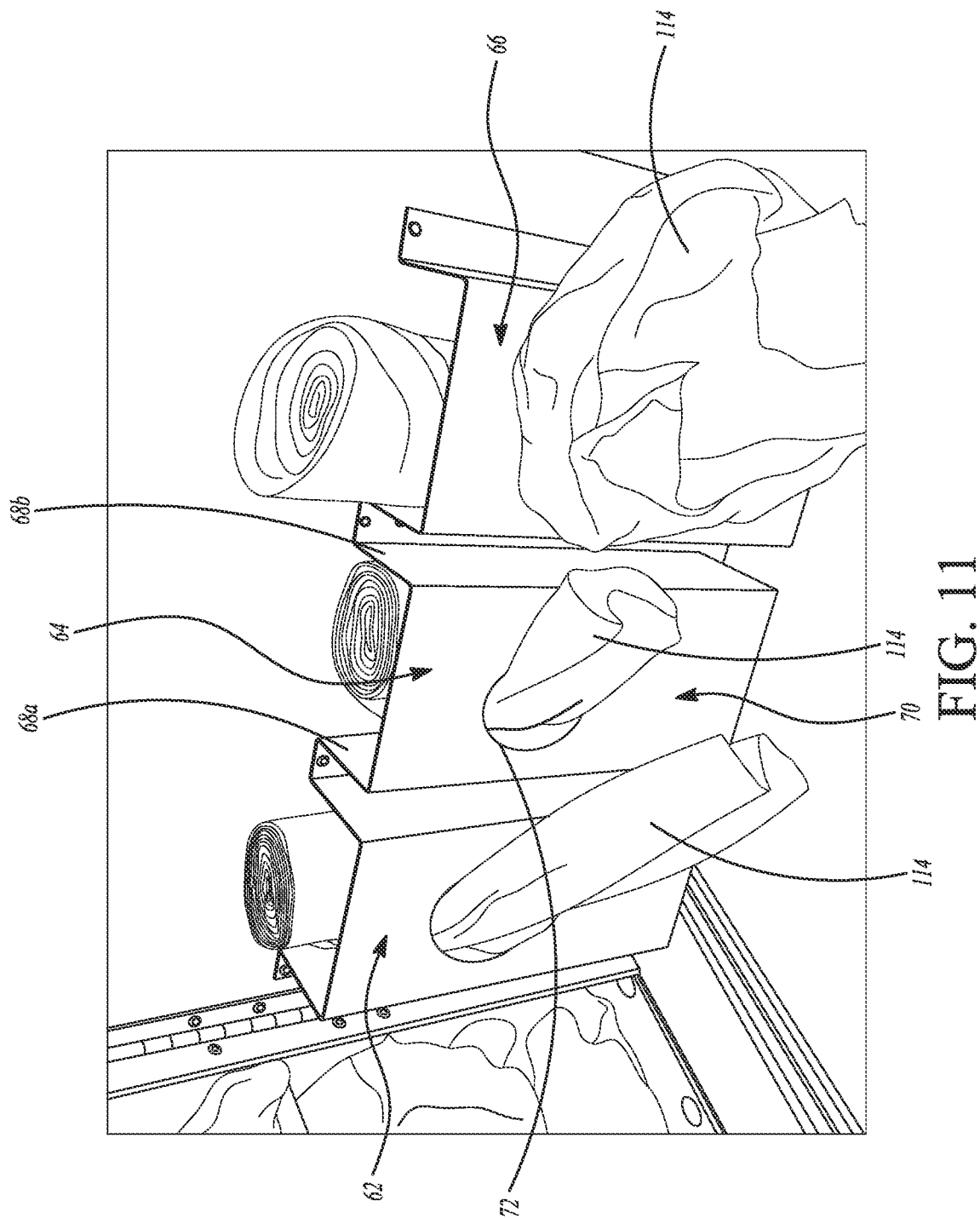
FIG. 11 is a detail perspective view of an embodiment of dispenser units positioned on the interior surface of the access door.

The embodiment of the disposal bag dispenser 56 as depicted in FIG. 11 includes a plurality of elongated units such as elongated units 62, 64, 66 in side by side relationship. Each elongated unit 62, 64, 66 includes a pair of side members 68a, 68b and a floor member all connected to the inwardly oriented face 42 of the access door 34 and projecting outward therefrom and an outer face plate 70 connected to the side members 68a, 68b and floor member at a spaced distance from the inwardly oriented face 42 of the access door 34 such that the side members 68a, 68b, floor member and outer face plate 70 define an inner cavity. An aperture 72 defined in the outer face plate 70 is configured to direct discrete waste collection bags present on a bag roll B outward is a readily accessible manner. The aperture 72 can have any suitable configuration. In the embodiment depicted in FIG. 11, the aperture 72 can be circular or ovoid. As depicted in FIG. 11 three lower elongated units 62, 64 and 66 are rectangular members positioned in spaced relationship with one another such that three different types of waste disposal bags can be positioned in side-by-side relationship such that the leading edge of each specific bag type is presented in a readily accessible manner. In certain embodiments and applications, the various types of collection bags 115 will be color-coded based on desired applications.

It is contemplated that the collection bags 115 will be configured to collect any waste found in the hospital region to be cleaned as well as to contain any spent cleaning supplies including, but not limited to mop bundles, floor and wall cleaning pads and the like. Collection bags 115 can be composed of a suitable polymeric film having a thickness between 0.5 mil and 10.0 mil and can be resistant to tears and punctures. In certain embodiments, the thickness of the polymeric film can be between 2 and 5 mil. It is also contemplated that the collection bags 115 can be color coded based on function and performance characteristics, for example as red, yellow and blue depending upon the nature of the waste and the mandated handling procedures that are associated with the particular type of waste. The configuration as disclosed herein permits the easy access to the desired bag type based upon variables such as the specific cleaning site, particular cleaning operation be performed etc.

The moveable service cart 10 as disclosed herein can also include suitable devices either removably mounted on the top face member 24 of the central storage housing 18. These can include an upwardly projecting apron 76 that projects upward from the top face member 24 and is generally co-planer with associated side and rear wall members wall members and front region to define an upper work region 78. The upper work region 78 can be configured to receive one or more containers such as a container 80 and/or charging station 82 as depicted in FIG. 13.

Figure 13:
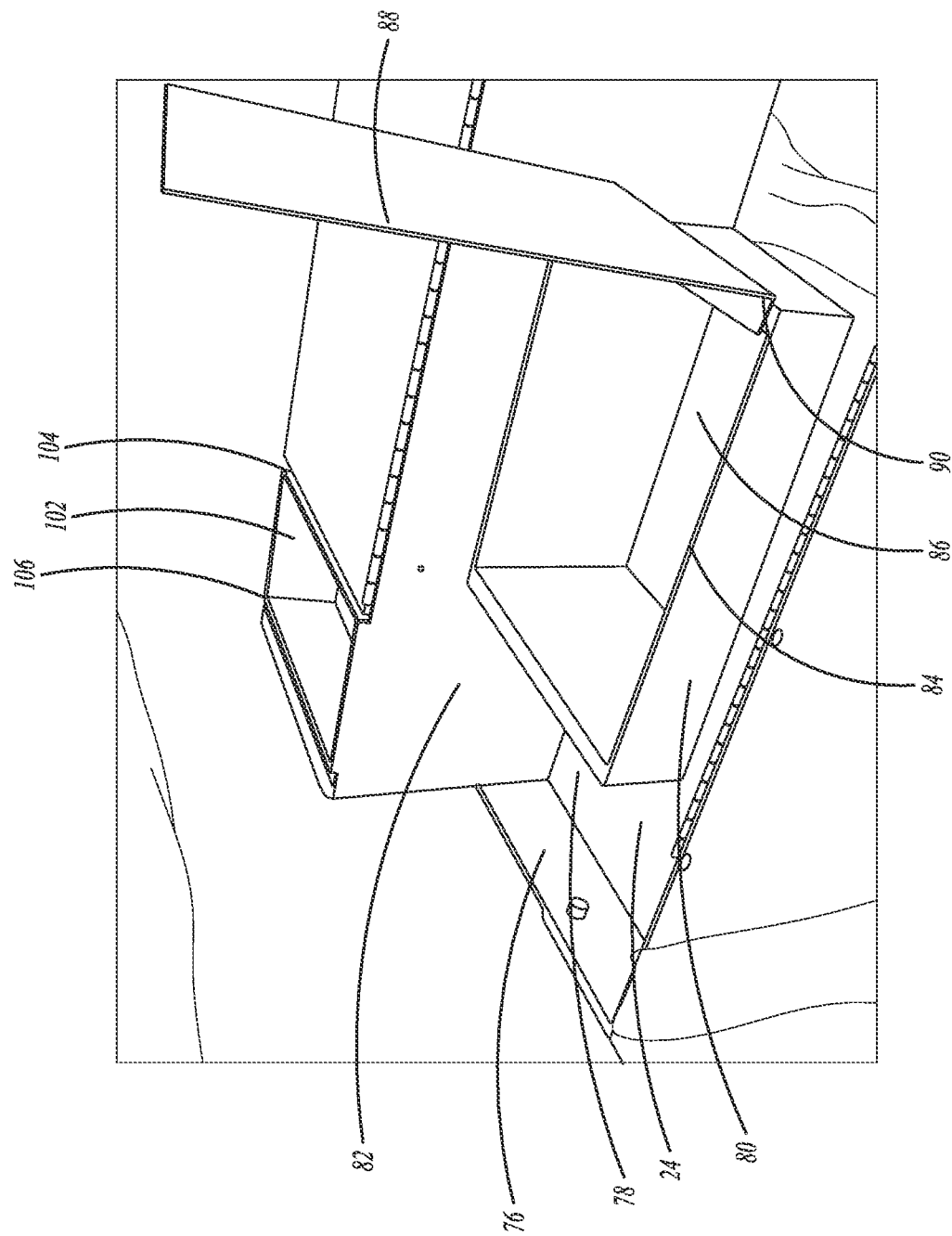
FIG. 13 is a detail perspective view of an embodiment of an embodiment of the top surface of the moveable service cart of FIG. 1.
Figure 14:
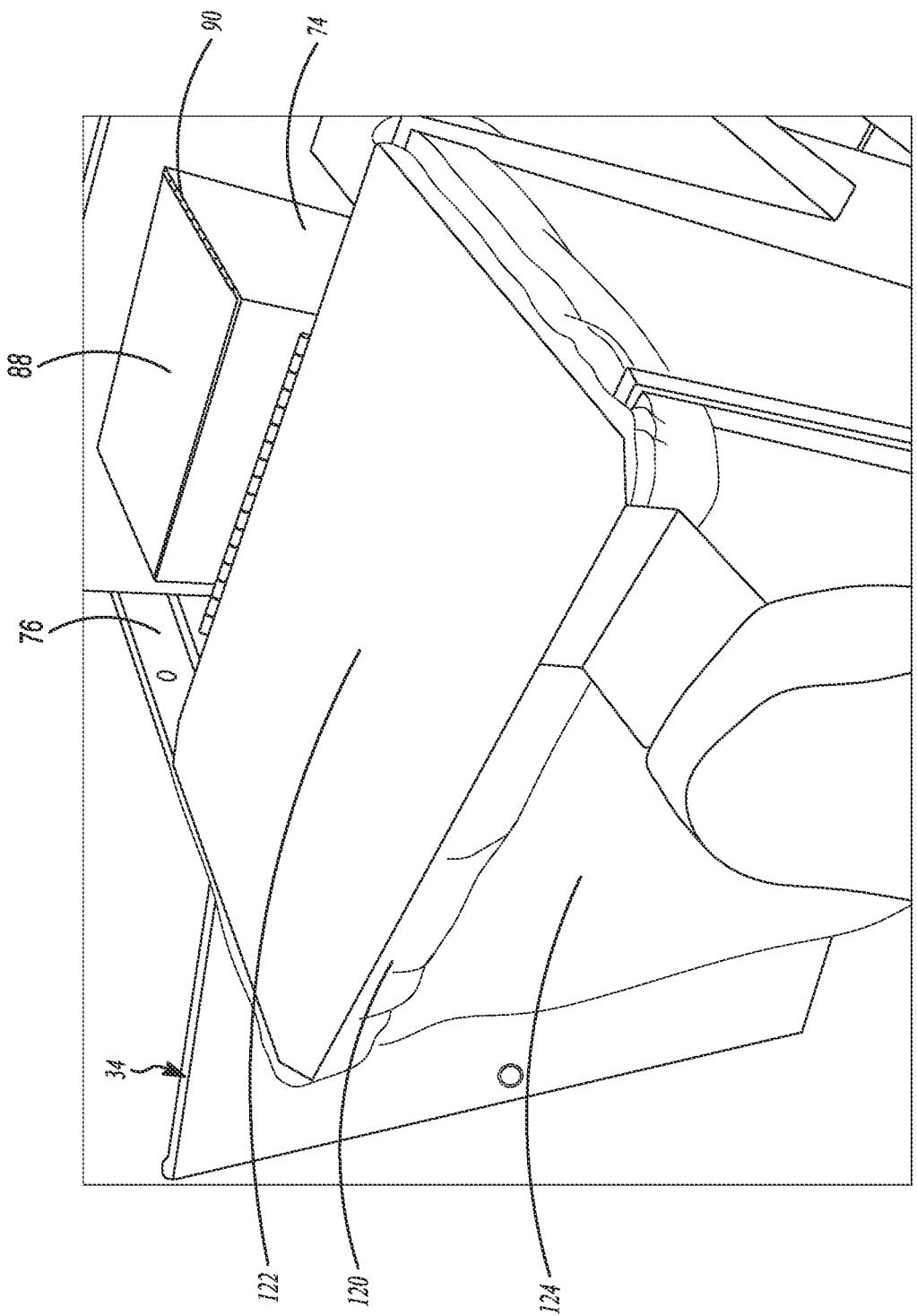
FIG. 14 is a detail top view of an embodiment of the waste disposal container component of the service cart of FIG. 1.

An embodiment of container 80 as depicted in FIG. 13 includes a fluid-tight box 84 having an inner chamber 86 having a depth that is at least equal to the upward projecting height of apron 76. It is also contemplated that the depth of the container 80 can be up to double the height of the apron 76. The fluid tight container 80 as depicted has a rectangular dimension and includes a cover 88 that pivots between an open and a closed position by means of a hinge mechanism 90 located at one edge of the cover 88.

Figure 12:
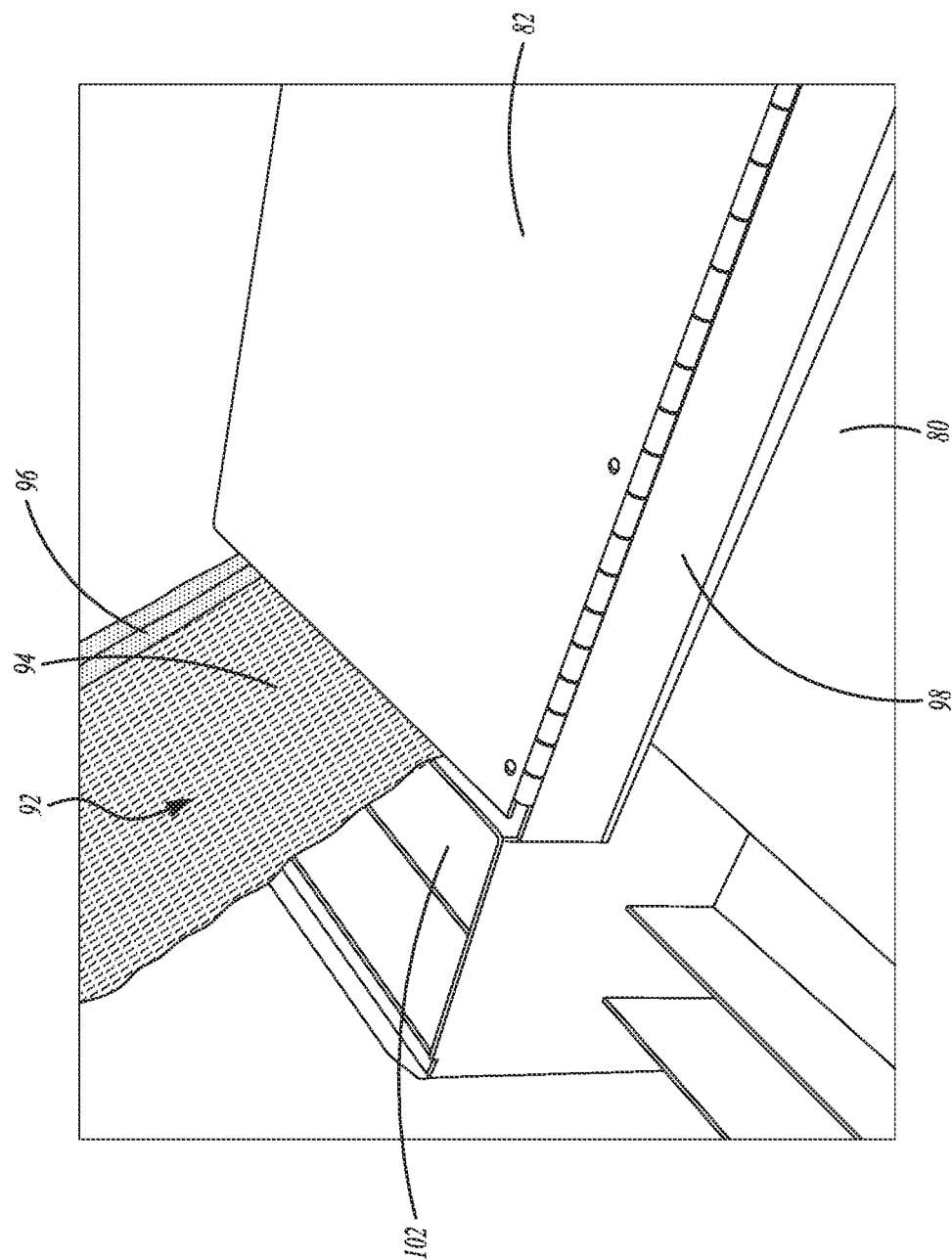
FIG. 12 is a detail of an embodiment of a fluid charging chamber positioned of the top of the moveable service cart of FIG. 1.

An embodiment of the charging chamber 82 is also depicted in FIGS. 12, 13. The charging chamber 82 is configured to receive a suitable cleaning solution in an interior chamber together with a quantity of single-use floor pads such as representative single-use floor pad 92 shown in FIG. 12. The single use floor pad can have any suitable configuration. One non-limiting examples is a single use floor pad that is dimensioned to be removably attached to a suitable planar mop pad base that can be mounted in pivotal or swivel relation on a wand as desired or required. In certain embodiments, the single-use floor pad 92 can have an elongated rectangular configuration having a major axis between 12 and 20 inches, a minor axis between 3 and 9 inches and a thickness between 0.25 inches and 0.5 inches. The single-use floor pad 92 can include a first elongated surface region 94 composed of a micro fiber material layer that extends over at least a portion of the first elongated surface region. 94. In the embodiment depicted in the drawing figures, the microfiber layer extends over the entire face of the first elongated surface region 94. The opposed second elongated region can be configured with a suitable engagement region extending over all or a part of the elongated surface region such as loop region. A suitable flexible absorbent region can be interposed between the first and second surfaces and can be composed of a suitable absorbent polymeric foam. The single-use floor pad 92 can also include a suitable agitator strip member 96 that is connected to one edge of the single-use floor pad 92 and project outward therefrom. In the embodiment depicted, the agitator strip member 96 such as the scrubbing strip illustrated projects from the first surface and overlays a portion of the micro fiber material layer.

In the embodiment as illustrated, the charging chamber 82 has a rectangular outer body 98 having a length that is configured to be received in the upper work region 78. The top of the charging chamber 82 includes lid 100 that is pivotal between an open position and a closed position as shown. The top of the charging chamber 82 also includes a collection tray 102 configured to be mounted proximate to a first end of the charging chamber 82 in order to collect excess cleaning fluid as a single-use floor pad 92 is drawn through a slit 104 defined between a leading edge of the lid 100 and an edge defined on the collection tray 102. The collection tray 102 can have a suitable orifice such as orifice 106 defined in a lower edge that connects with the inner fluid region defined in the charging chamber 82. The slit is configured to remove excess cleaning fluid and to assure that an appropriate volume of the cleaning fluid that remains associated with the single use floor pad is appropriate for the intended use.

Figure 5:
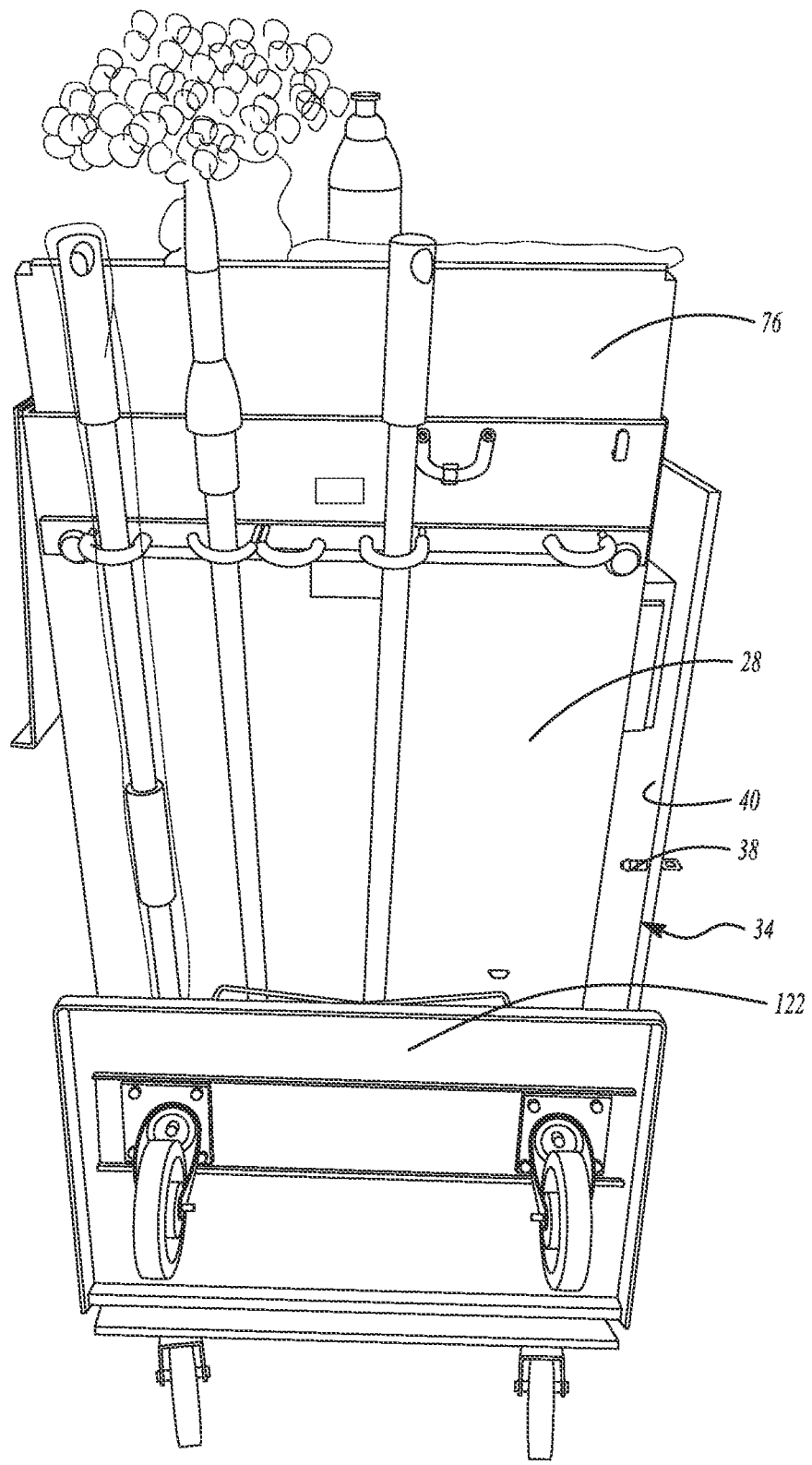
FIG. 5 is a detail view of the side view of FIG. 3A with the base member retracted.
Figure 6:
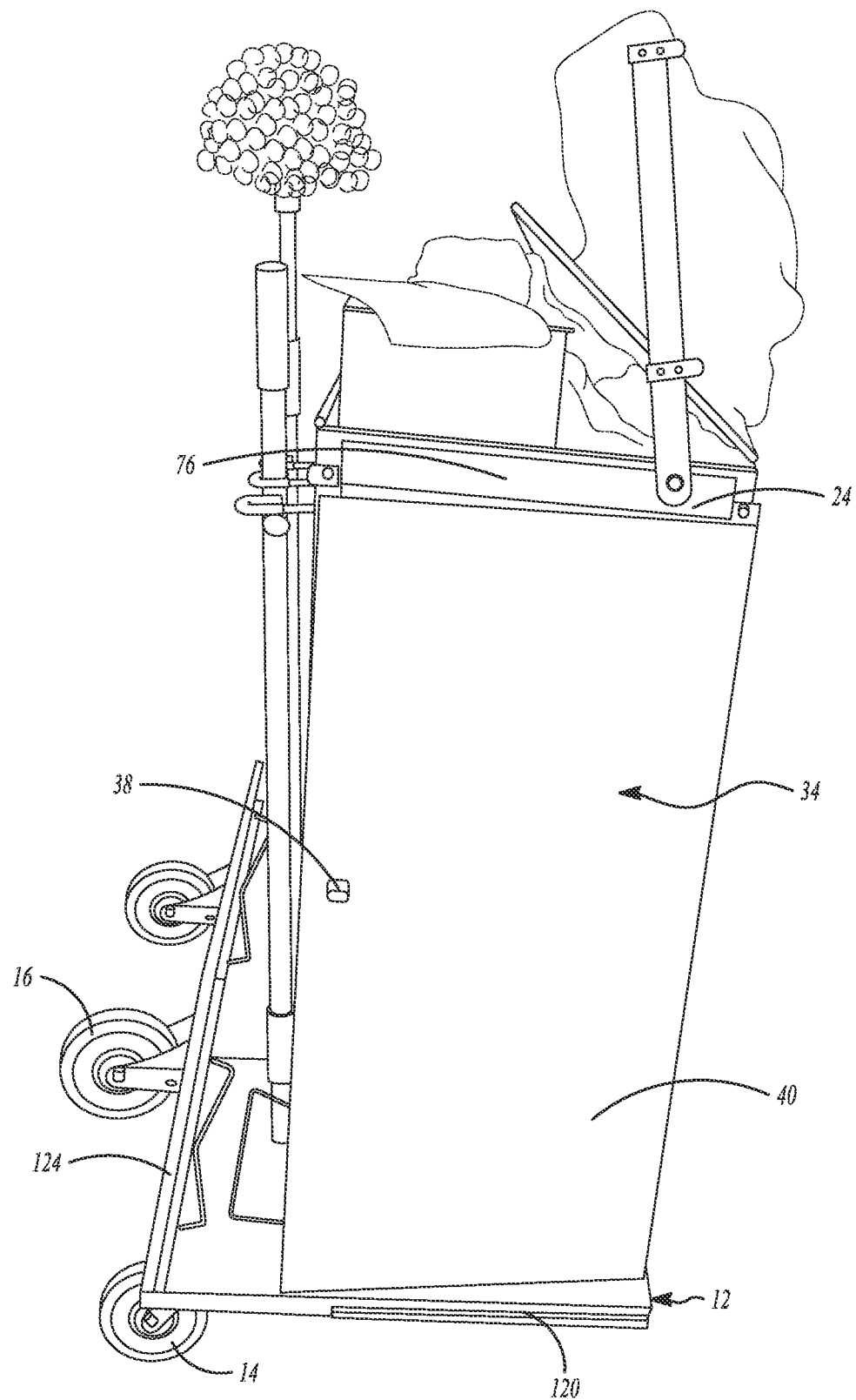
FIG. 6 is a front view of the embodiment of the moveable service cart of FIG. 1 with the base and waste receptacle holder retracted.

In the embodiment depicted in the various drawing figures, the base member 12 is an elongated rectangle in which the central storage housing is positioned in offset relationship proximate to one edge 110 of the base member 12. The opposed edge 112 is proximate to the leading edge of the base member 12 that is configured as a flat planar member that is adapted to receive an administration device such as a mop bucket 114, pad charging member 116, double mop bucket 118 or the like in a removable manner.

Where desired or required, the portion of the base member 12 proximate to the opposed edge 112 can be continuously contiguous with the portion of the base member proximate to the central storage housing 18. Alternately the base member 12 can be composed of two portions that are pivotal relative to one another. In the embodiment depicted in the drawing figures and particularly depicted in FIGS. 4, 5, and 6 includes a base member 12 that has a first portion of disposal bag support form 120 proximate to the central storage housing 18 and a second portion that is pivotal relative to the first portion of disposal bag support form 120 in the manner illustrated.

The moveable service cart 10 as disclosed herein also includes a disposal bag support form 120 includes a frame on which a suitable disposable waste receptacle such as bag 124 can be mounted. Where desired or required, device can also include aa cover such as lid 122. Lid 122 can be pivotally mounted relative to the disposal bag support form 120 such that the lid covers the bag 124 when in place on the disposal bag support form 120. Where desired or required, the disposal bag support form 120 can include suitable articulatable connection 130 that is connected to the central storage housing 18 to permit the form to pivot upward to facilitate storage. In the embodiment depicted, the suitable articulatable connection 130 is mounted to opposed sides of the central storage housing 18 at a location proximate to the apron 76 and is configured to permit the outer most region of the bag support from 120 to pivot to a location above the top of the central storage housing 18 to facilitate storage.

Figure 1:
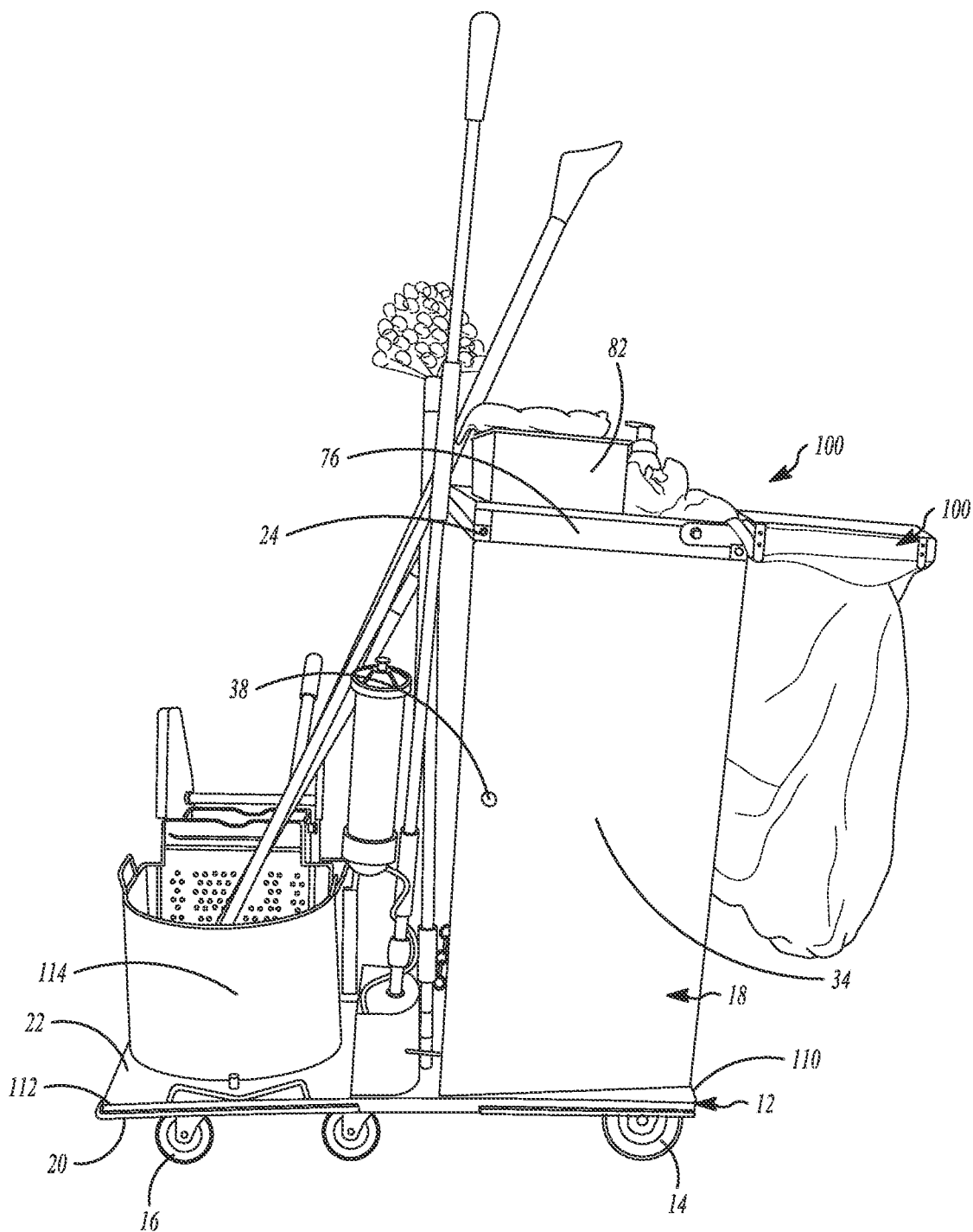
FIG. 1 is a front perspective view of an embodiment of a moveable service cart as disclosed herein.
Figure 2:
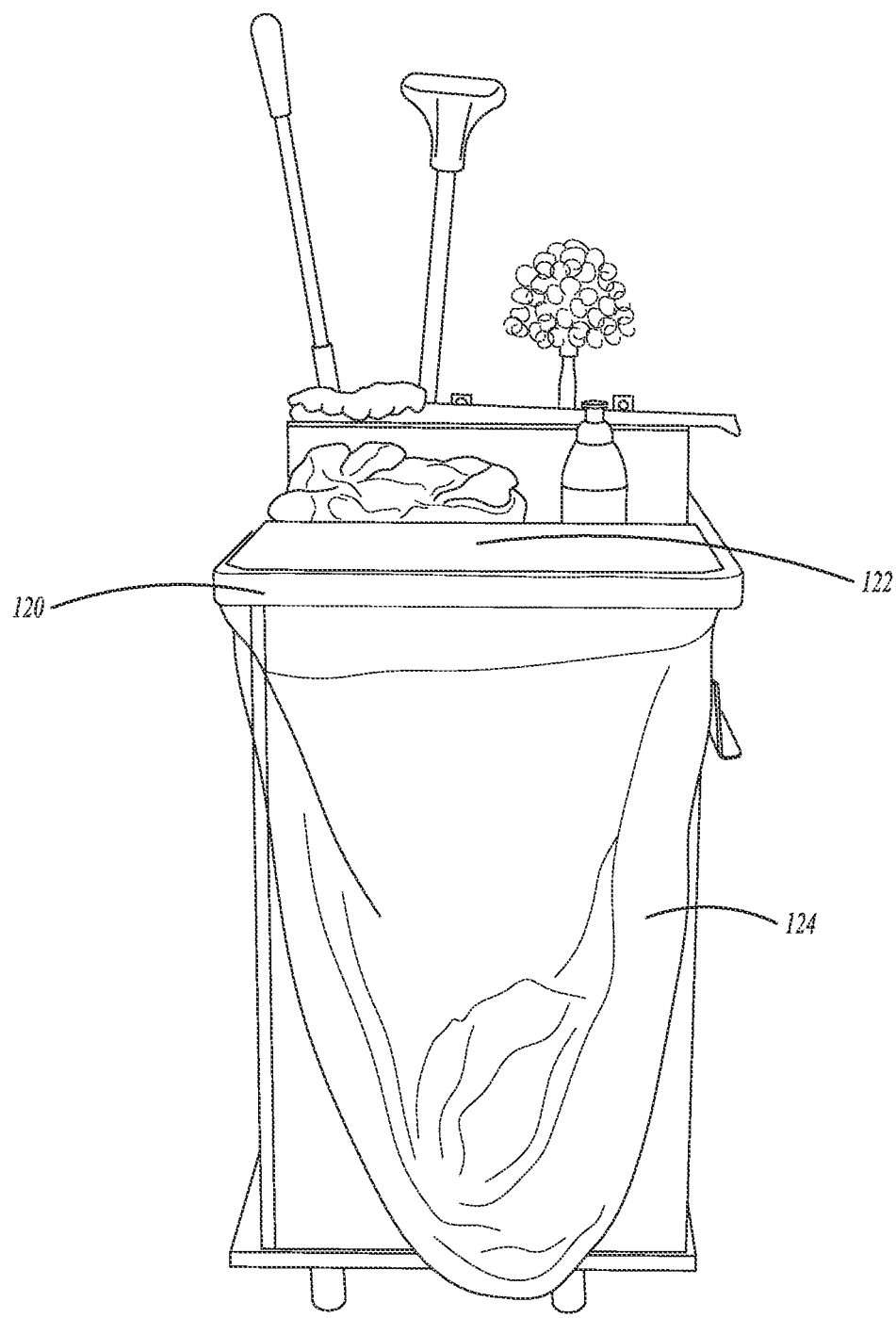
FIG. 2 is a side perspective view of the moveable service cart of FIG. 1.
Figure 3A:
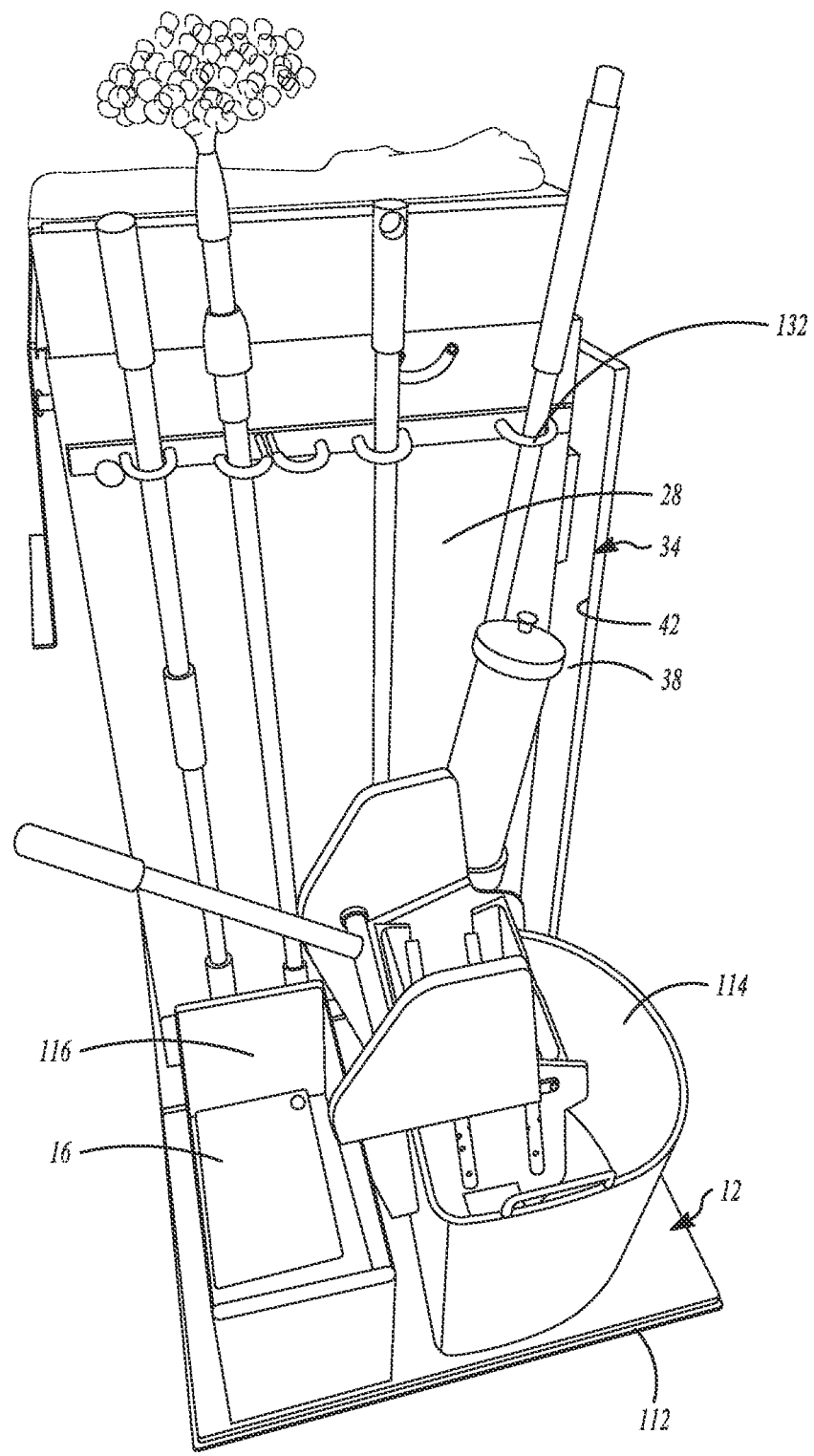
FIG. 3A is a side view of the moveable cart of FIG. 1.
Figure 3B:
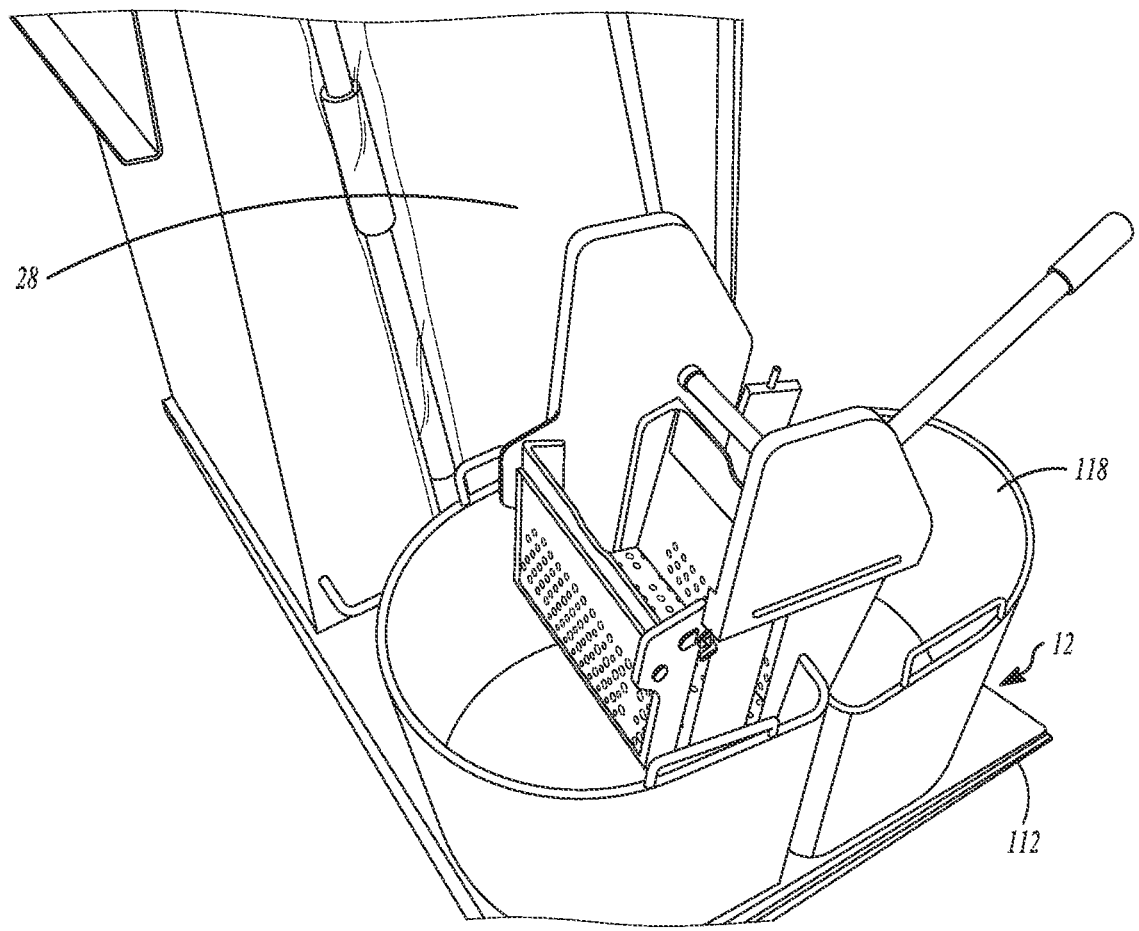
FIG. 3B is a detail perspective view of an embodiment of a mop bucket suitable for use in the moveable service cart embodiment of FIG. 1.

It is also contemplated that the moveable service cart 10 as disclosed herein can include one or more hooks or anchors to maintain various long handled cleaning devices in position relative to the moveable service cart 10. As seen in FIGS. 1 and 3A, cleaning handle anchor mechanism(s) 132 can be affixed to a side wall member such as forward side wall 28 to maintain such devices at a location between the central storage housing 18 and the associated mop bucket 114. In configurations where the base member 12 is composed of two members, it is contemplated that the lower ends of the various long-handed cleaning tools will be supported by the base member that also supports the central storage housing 18.

Figure 15:
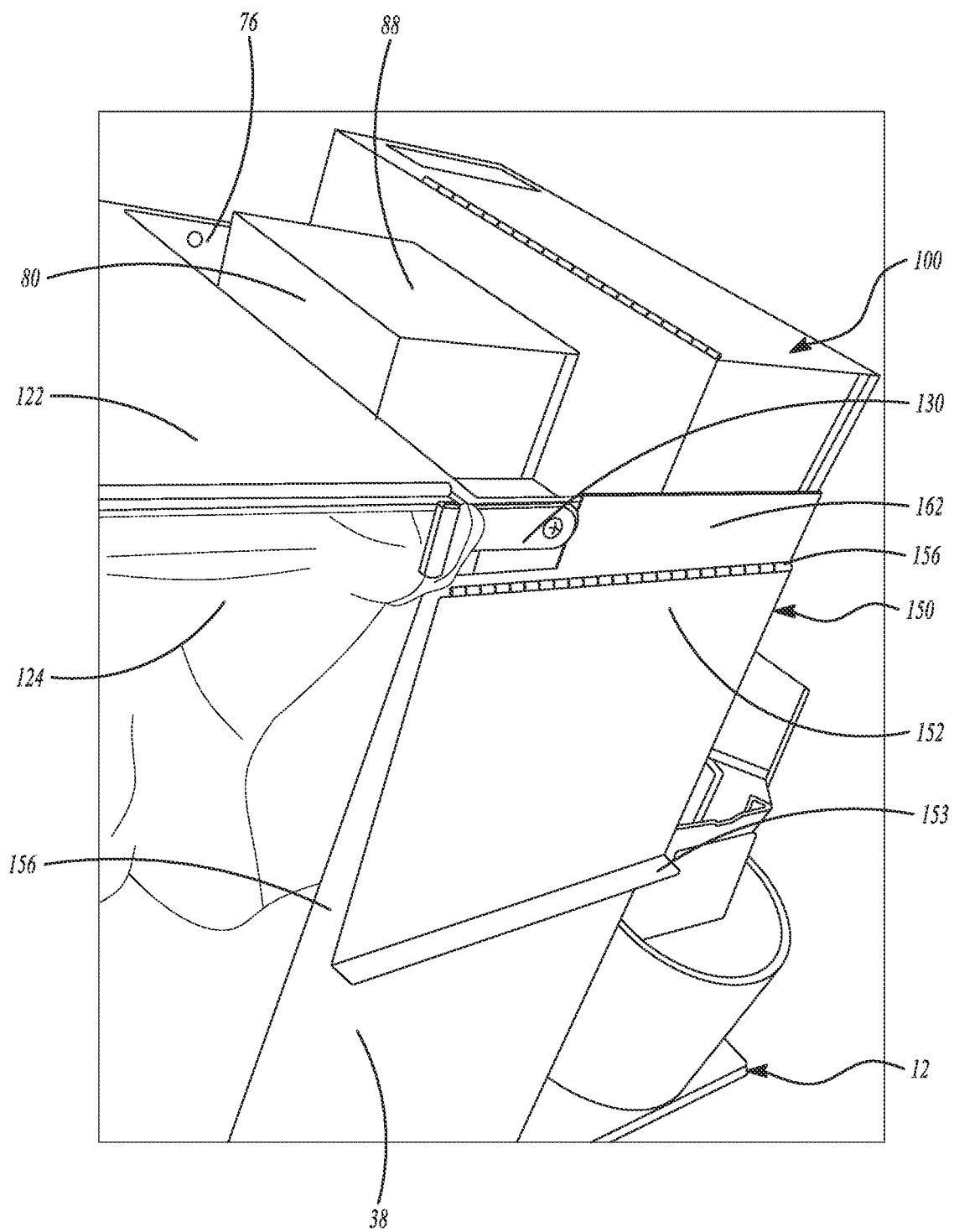
FIG. 15 is a rear perspective view of the service cart of FIG. 1 depicting an embodiment of the service desk device as disclosed herein.
Figure 16:
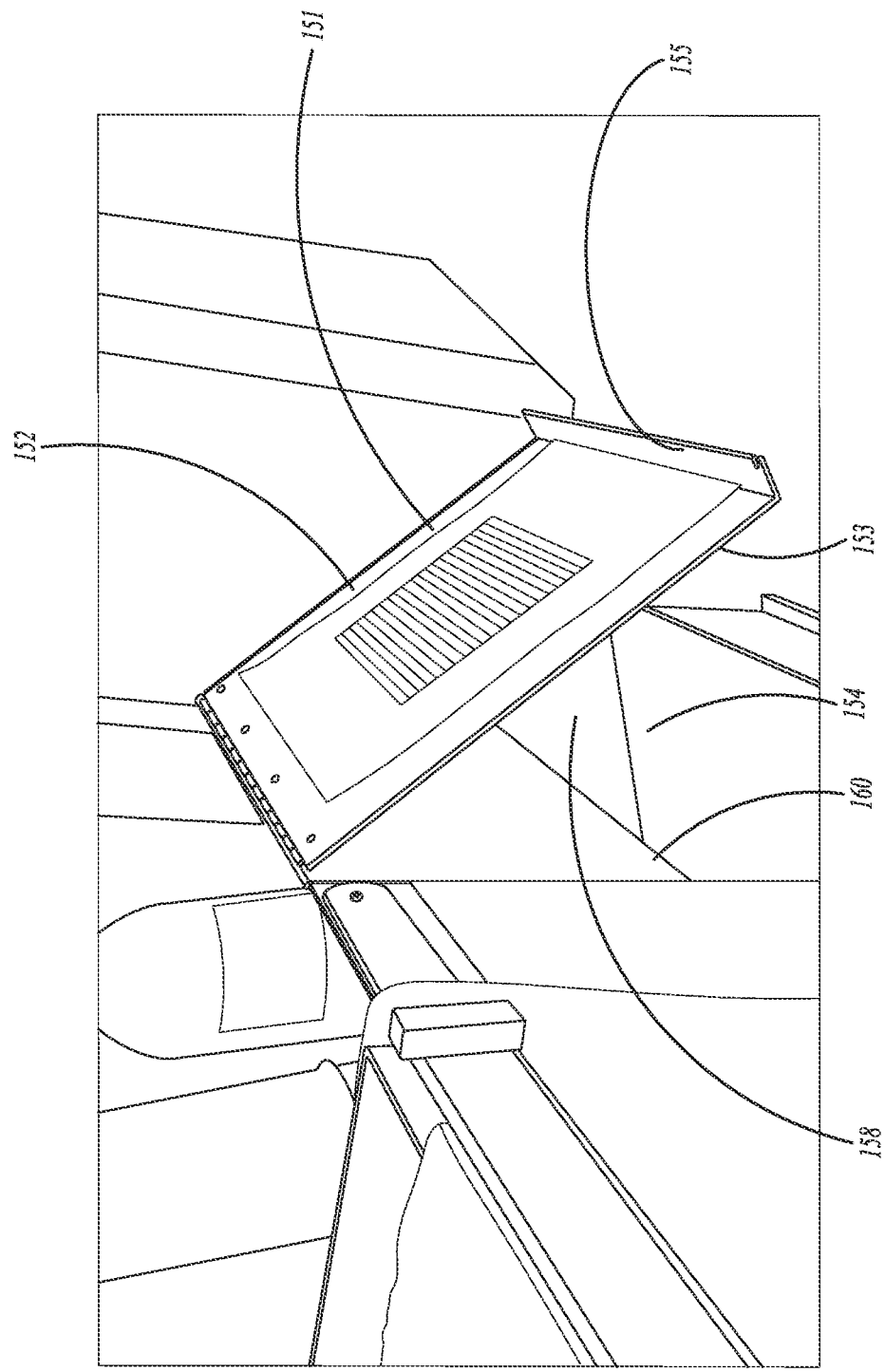
FIG. 16 is a perspective view of the service desk of FIG. 15 in the extended position.
Figure 17:
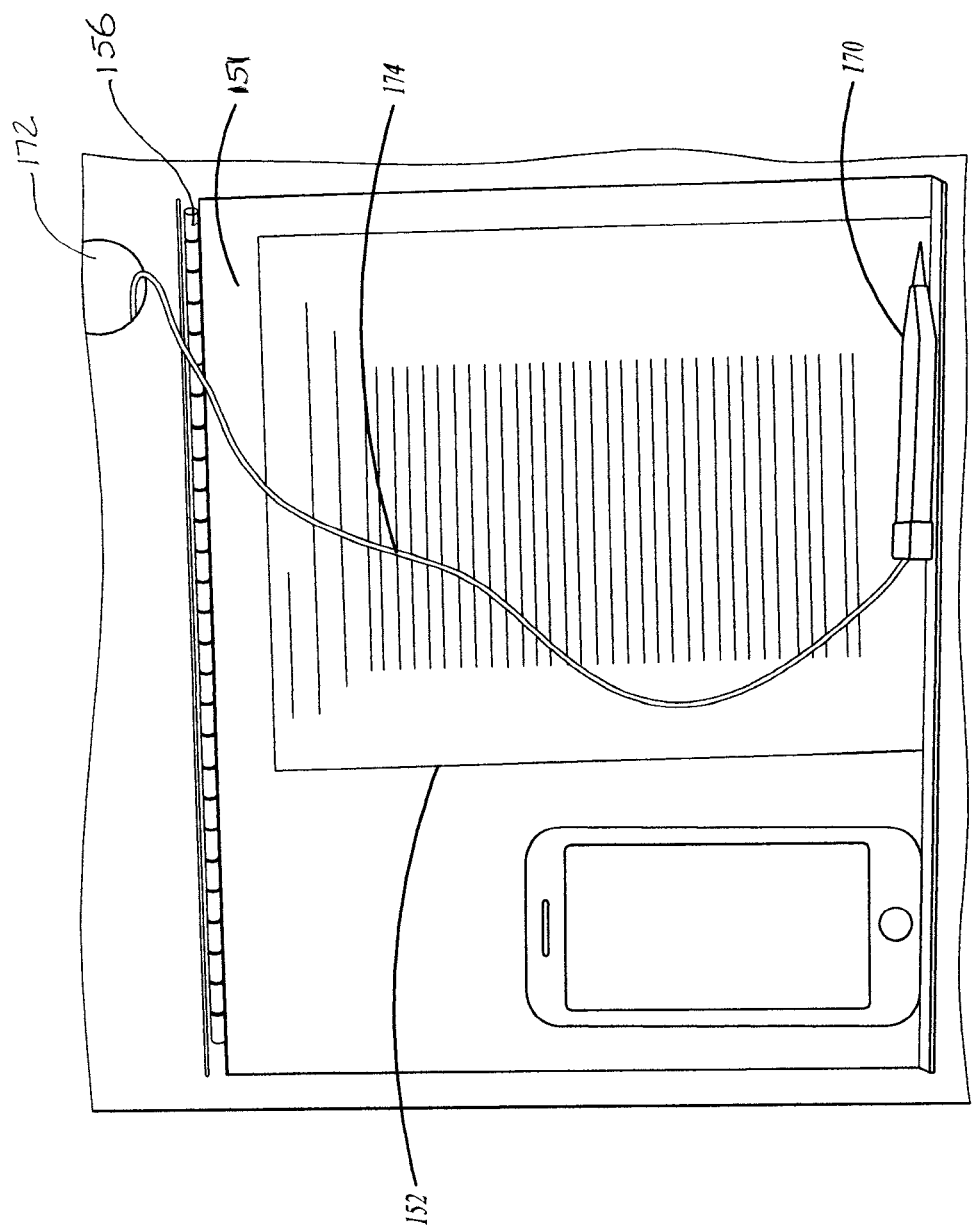
FIG. 17 is a front view of the service desk of FIG. 16.
Figure 18:
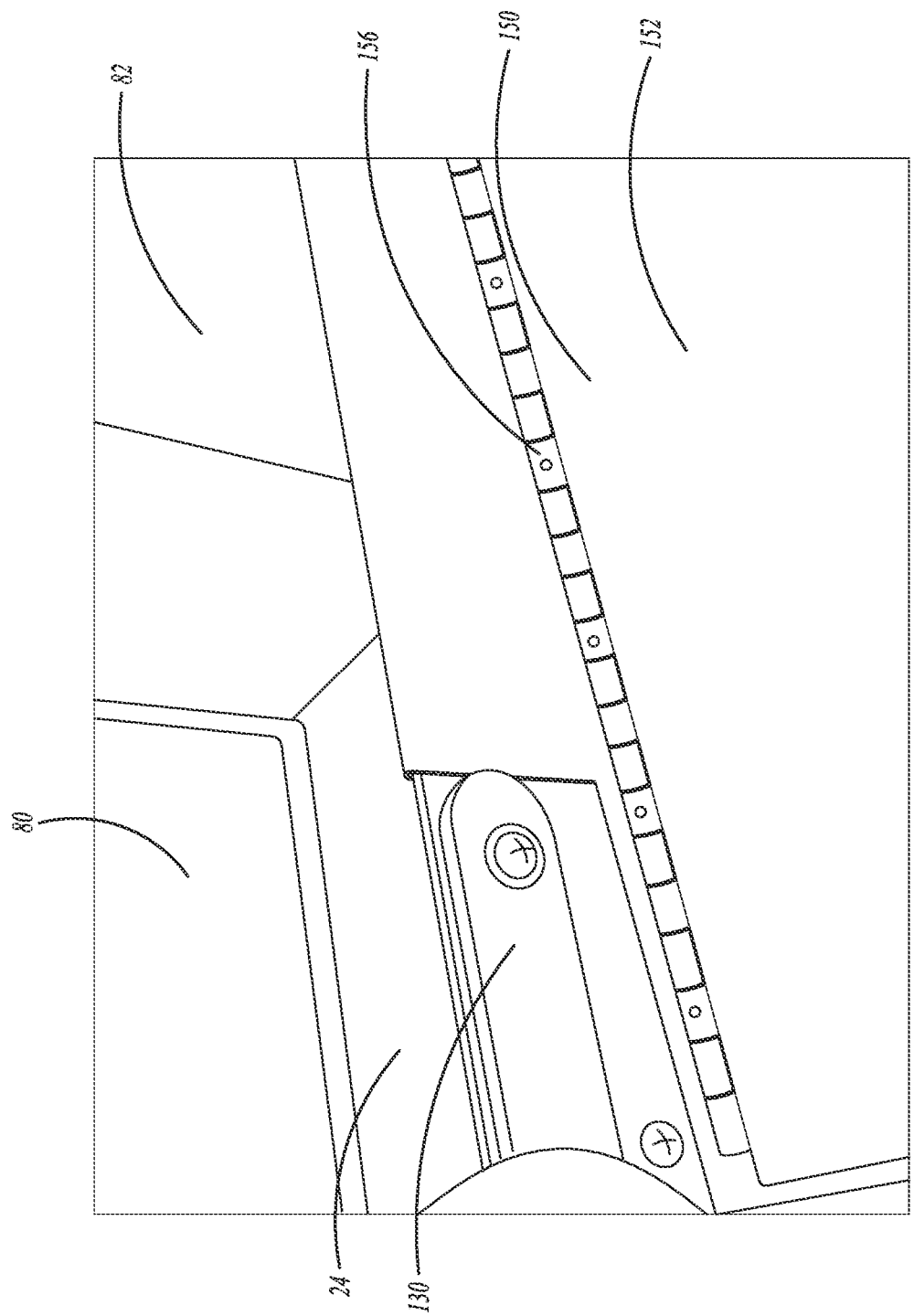
FIG. 18 is a detail of the service desk of FIG. 15.
Figure 19:
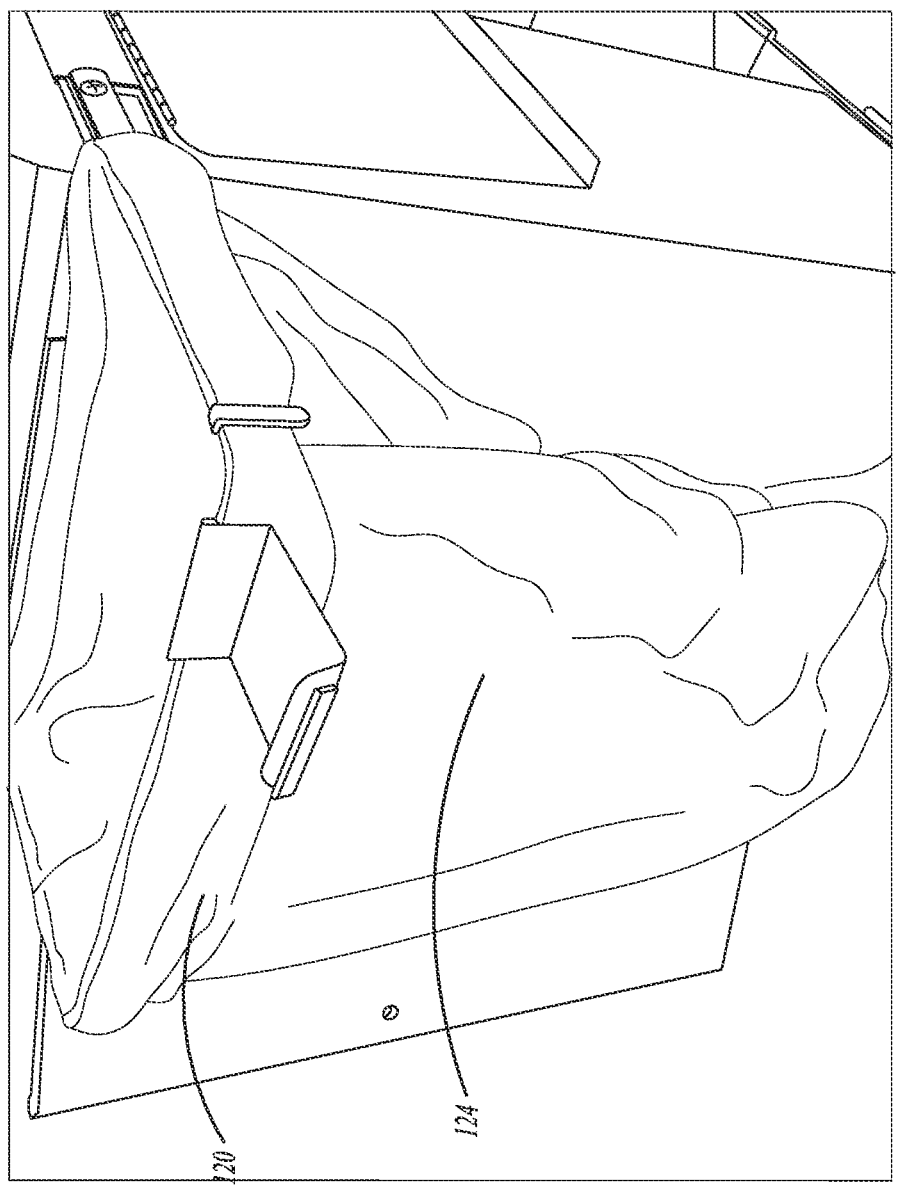
FIG. 19 is a top view of the waste disposal container component as depicted in Fig. in the open position.
Figure 20:
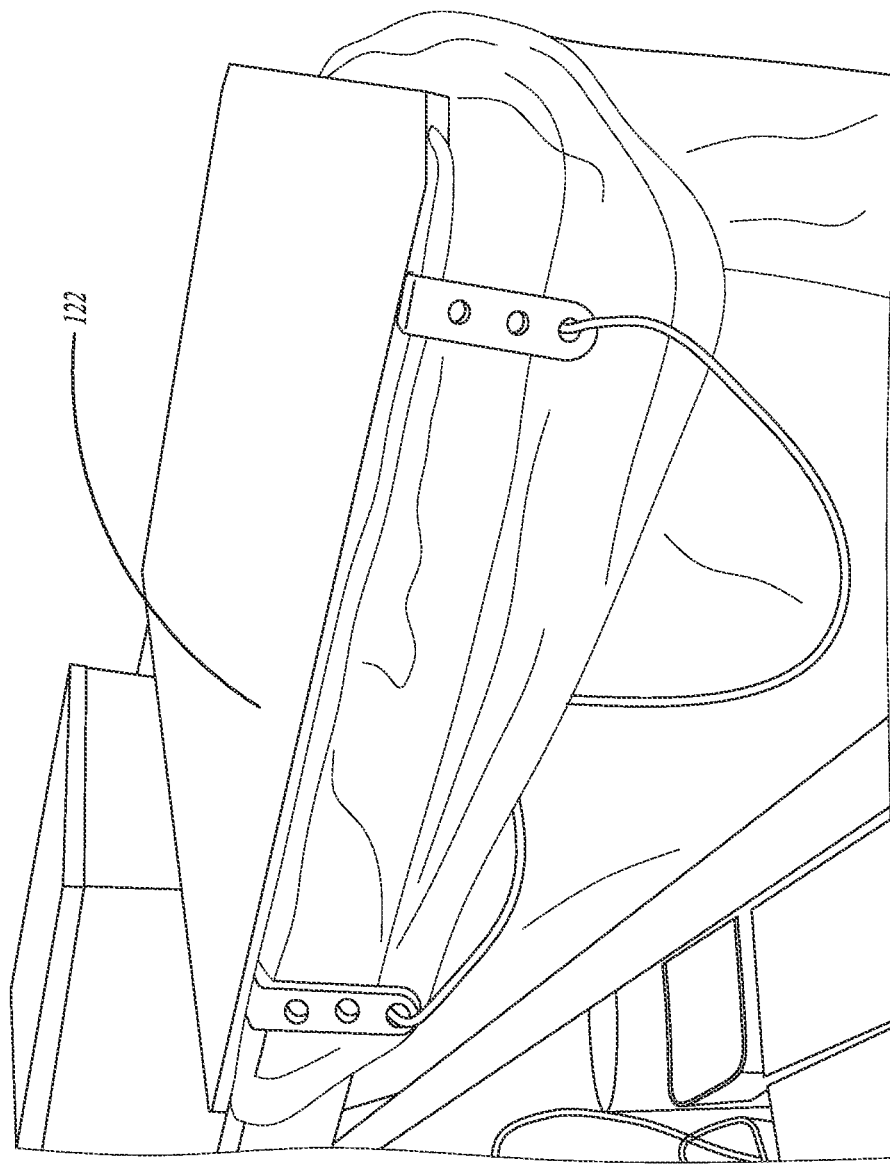
FIG. 20 is a top view top view of the waste disposal container component as depicted in Fig. in the open position.

The moveable service cart 10 as disclosed herein can also include at least one service desk assembly 150 that is connected to the central storage housing 18. The service desk assembly 150 can be employed by the service worker to verify the cleaning work being performed. In certain embodiments, the service desk assembly 150 can be removably mounted to the moveable service cart 10 while in other embodiments, it is contemplated that the service desk assembly 150 can be permanently attached. It is contemplated that the service desk assembly 150 can be pivotally mounted relative to the central storage housing 18 such that the main body of the service desk assembly 150 parallel to an associated side wall of the central storage housing 18 in the non-use or storage position as seen in FIG. 15 and the main body of the service desk assembly 150 projects angularly from the central housing when in a use position as seen in FIG. 16.

An embodiment of the service desk assembly 150 as employed with the service cart as disclosed is depicted in FIGS. 15-18 and FIGS. 22-27. It is contemplated that the service desk assembly 150 can be employed with the moveable service cart 10 as disclosed or can be employed separately as desired or required. An embodiment of the service desk assembly configured as a stand-alone device is depicted in FIGS. 29-36.

The main body of the service desk assembly 150 is composed of a planar body 152 has an outwardly oriented face 151 and an opposed inwardly oriented face 153. The planar body can include a lower ledge 155 that is contiguously joined to the planar body member 152 and projects outward from the outwardly oriented face 151 to define a suitable angle therewith. In the embodiment depicted in the drawing figures, the lower ledge 155 projects outward from the lower edge of the planar body member 152 and defines a right angle with the outwardly oriented face 151. The lower ledge 155 can extend from one side of the planar body member 152 to its other side, if desired or required. The lower ledge 155 can also include and outer lip 157 if desired or required.

The service desk assembly 150 also has a rear support 154 that is pivotally connected to the planar body member 152. In the embodiment depicted in the various drawing figures, the pivotal connection is accomplished by a hinge mechanism 156 interposed between the planar body member 152 and the rear support 154 and connected to both such that the planar body member 152 pivots outward relative to the rear support 154. The hinge mechanism 156 can have a suitable configuration. In the embodiment depicted in the various drawing figures, the hinge mechanism 156 can be a piano hinge and can be connected to the rear support 154 and the planar body member 152 at the upper ends of the respective elements as that term is defined when the service desk assembly 150 is in the use position.

The rear support 154 can be configured as a planar member if desired or required and is configured to be oriented parallel to the associated wall member of the central storage housing 18 of moveable service cart 10. The rear support 154 can have a length $R_L$ that is less than or equal to the length $P_L$ of the planar body member 152.

The service desk assembly 150 can also at least one moveable support mechanism such as at least one central folding strut 158 that is configured to maintain the planar body member 152 of the service desk assembly 150 in the extended or use position. In the embodiment depicted in the drawing figures, the at least one central folding strut 158 can be connected to either the rear support 154 or the inwardly oriented surface of planar body 152 and can extend to releasably contact the other respective member. In the embodiment depicted, the central folding strut 158 is pivotally attached to the inwardly oriented face 153 of the planar body member 152 by a suitable hinge member 159 such that the folding strut 158 can move between an extended position in which the distal edge of the folding strut 158 contacts an engagement member 160 defined on the rear support 154 and a retracted position in which the distal end of the folding strut 158 is located proximate to the hinge mechanism 156.

The service desk assembly 150 can releasably engage the moveable service cart 10 at any suitable location defined thereon. In certain embodiments, engagement between the moveable service cart 10 and the service desk assembly 150 will be at a suitable location defined on the central storage housing 18. In the embodiment as depicted in the drawing figured, the service desk assembly 150 can be configured with a hook member 162 configured to engage the upper surface of apron 76. The hook member 162 can extend upward from the hinge mechanism 156 or can be flush with the hinge 156 as desired or required. It is also contemplated that the hook member 162 can be symmetrically disposed relative to the other elements of the service desk assembly 150 or can be offset as desired or required.

The service desk assembly 150 can be configured to maintain various documents such as checklists as well as interactive digital devices thereon. Non-limiting examples of such interactive digital devices include cell phones, digital tablets or the like. can be configured to present a digital or print version of desired cleaning operations that can be checked off as the worker completes various operations to assure cleaning compliance. It is also with in the purview of this disclosure that the service desk be equipped with suitable asset location devices to tie the location of the cleaning operations to the service desk and associated moveable service cart 10 that has been employed.

Figure 8:
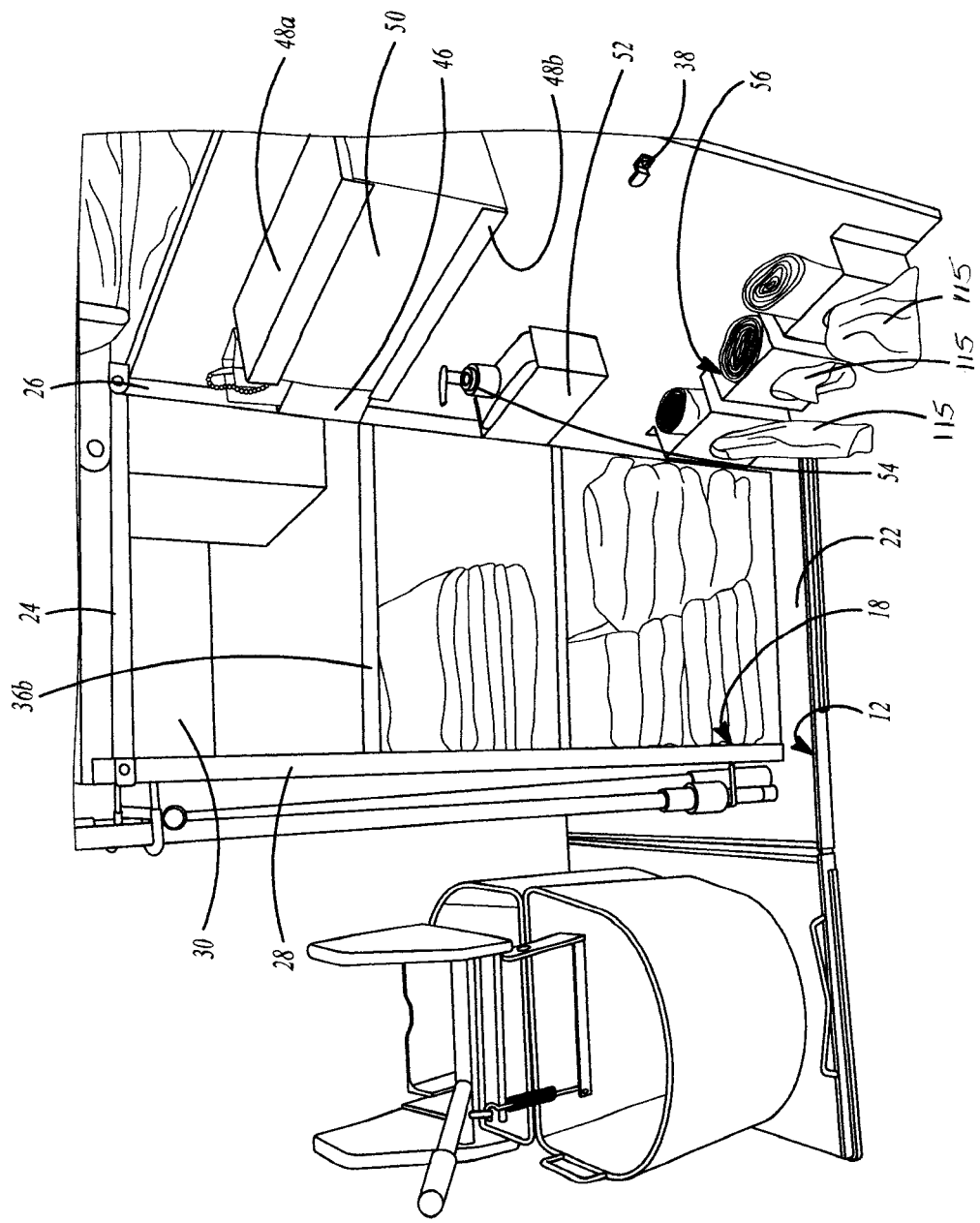
FIG. 8 is a detail view of FIG. 7.
Figure 10:
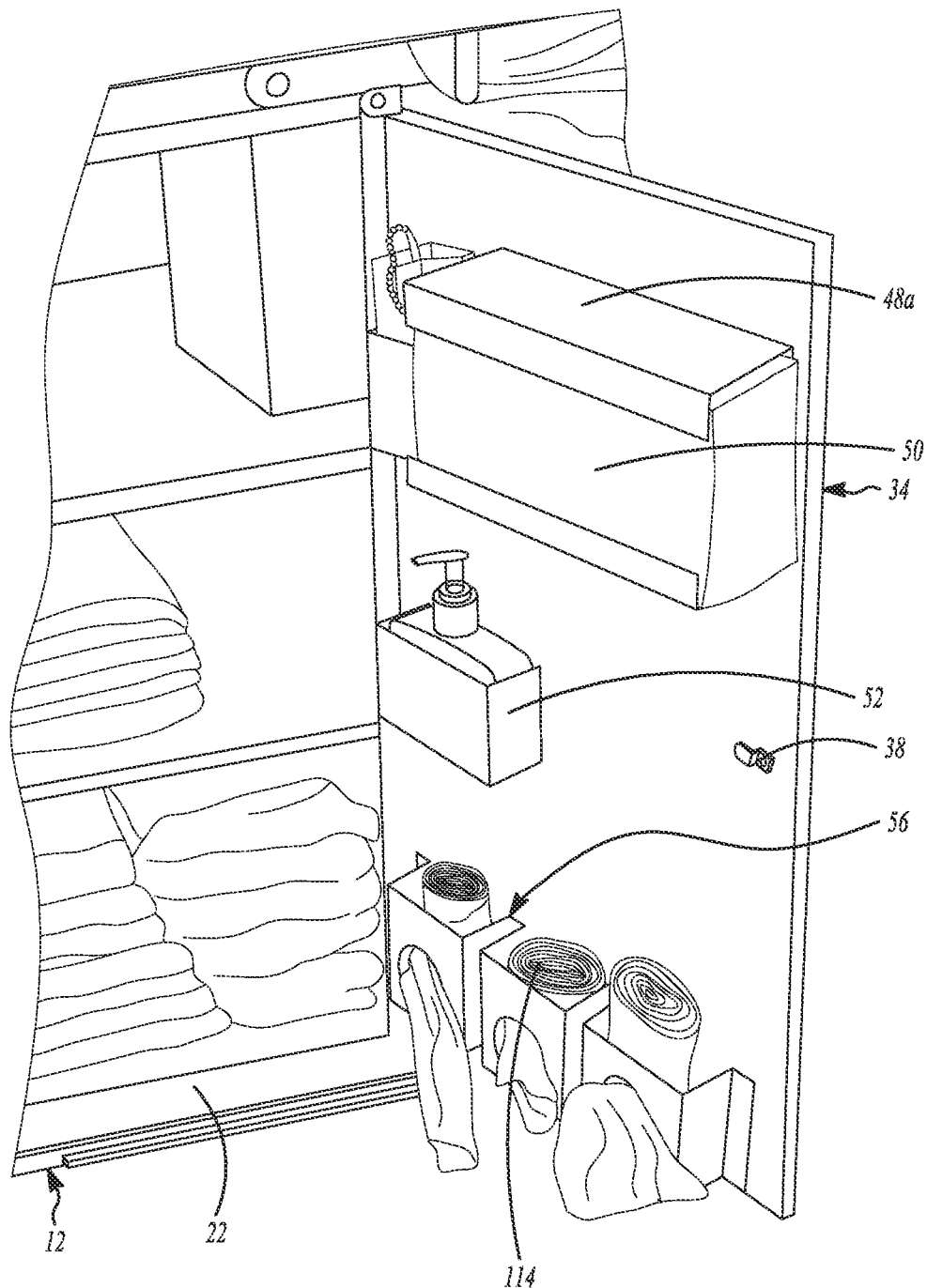
FIG. 10 is a detail view of an alternate embodiment of the interior of the access door of FIG. 1.
Figure 21A:
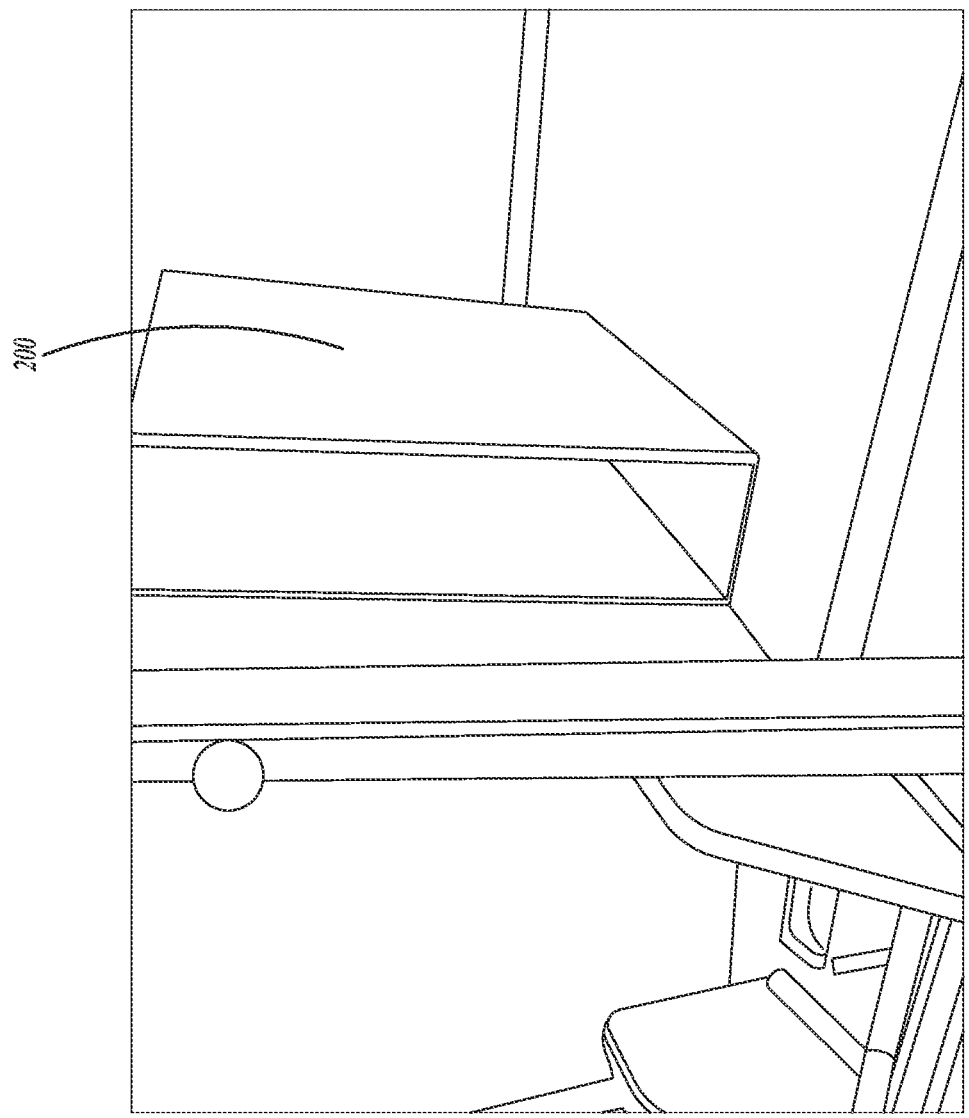
FIG. 21 A is a detail view of an embodiment of a removable slot container as depicted herein.
Figure 21B:
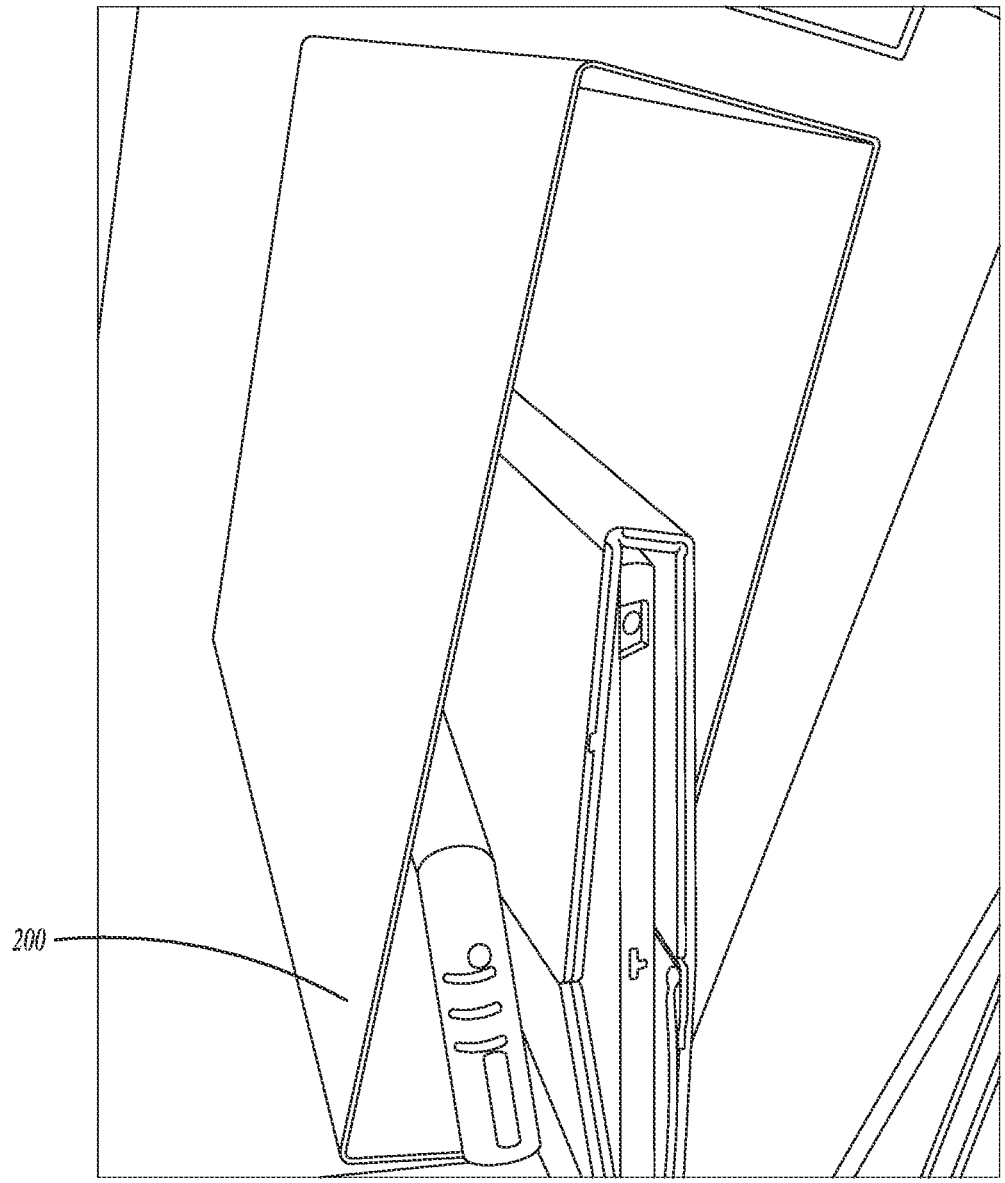
Figure 22:
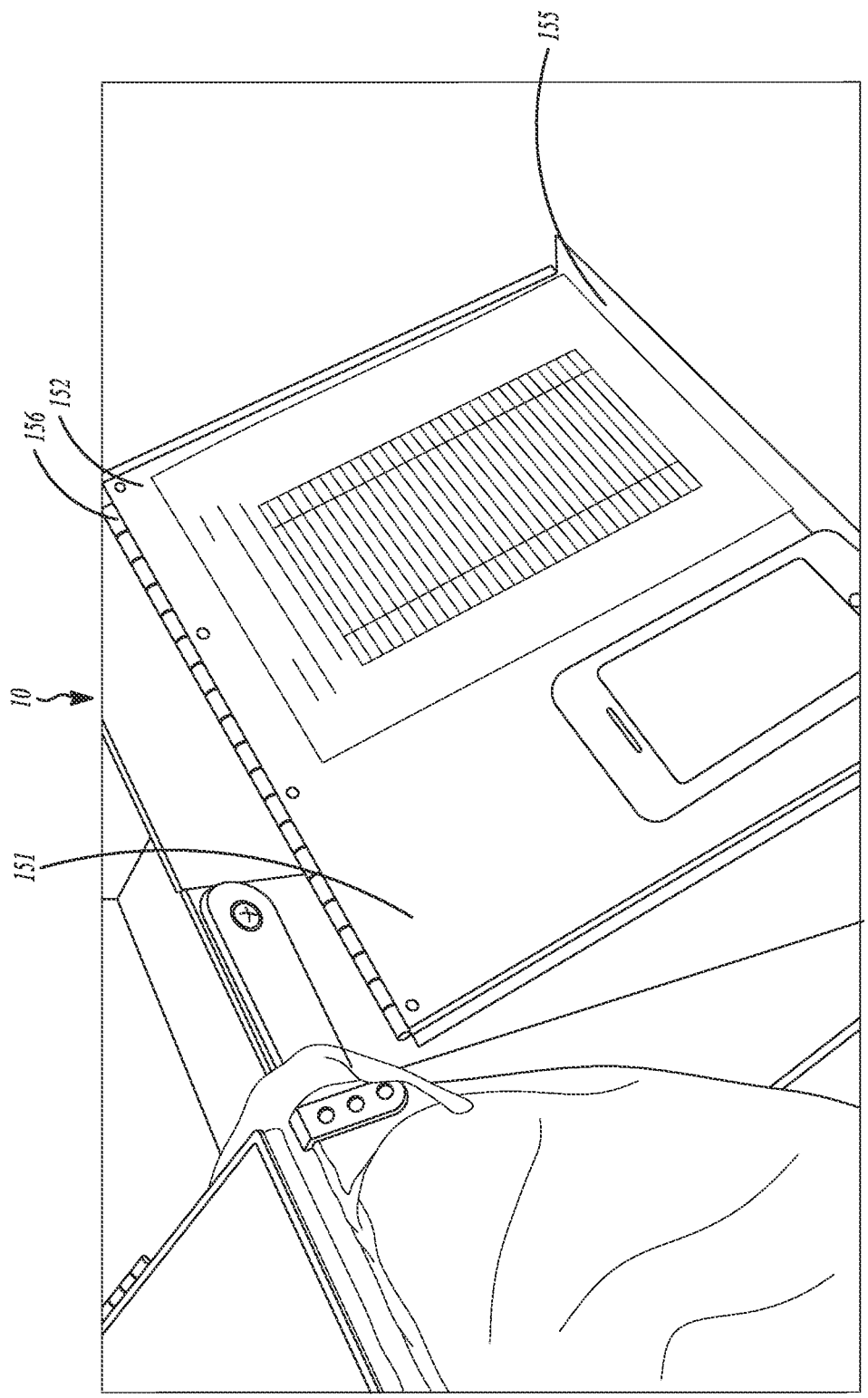
FIG. 22 is a perspective view of an embodiment of the service desk as disclosed herein in combination with a service cart as disclosed herein.
Figure 23:
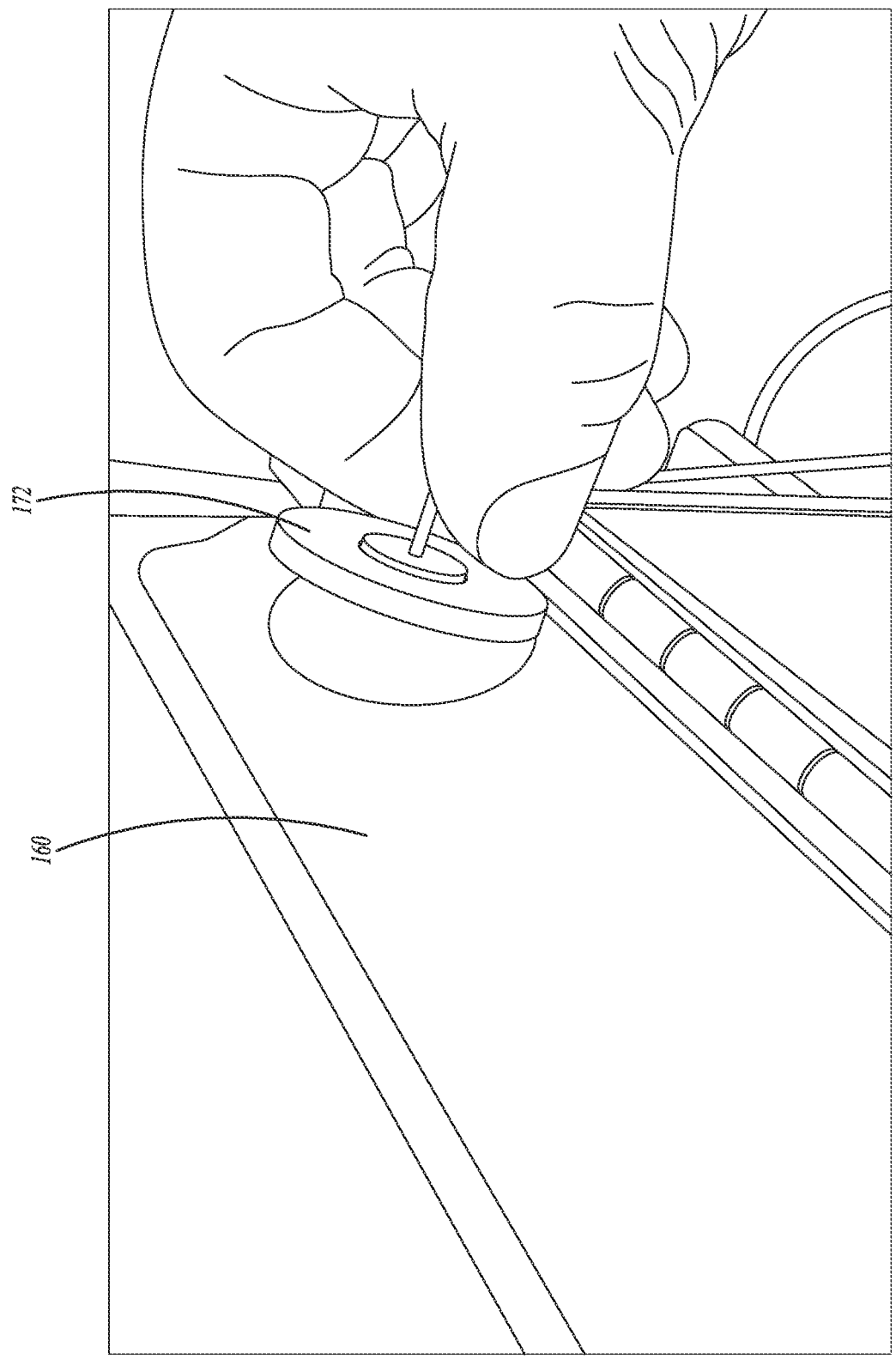
FIG. 23 is a detail view of a writing implement mounting device as disclosed herein.
Figure 24:
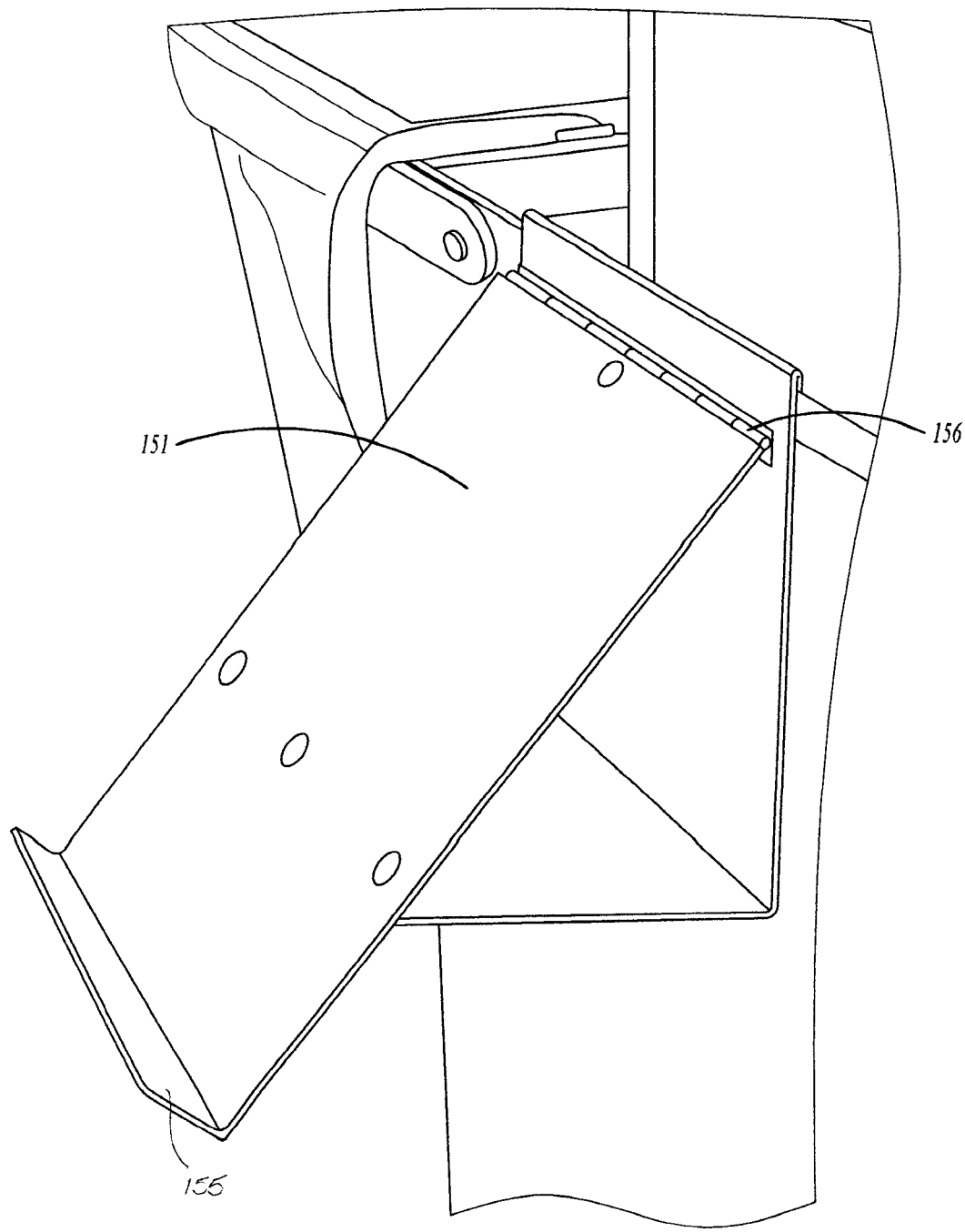
FIG. 24 is a side view of the embodiment of the writing desk as disclosed herein in the operative position relative to a service cart.
Figure 25:
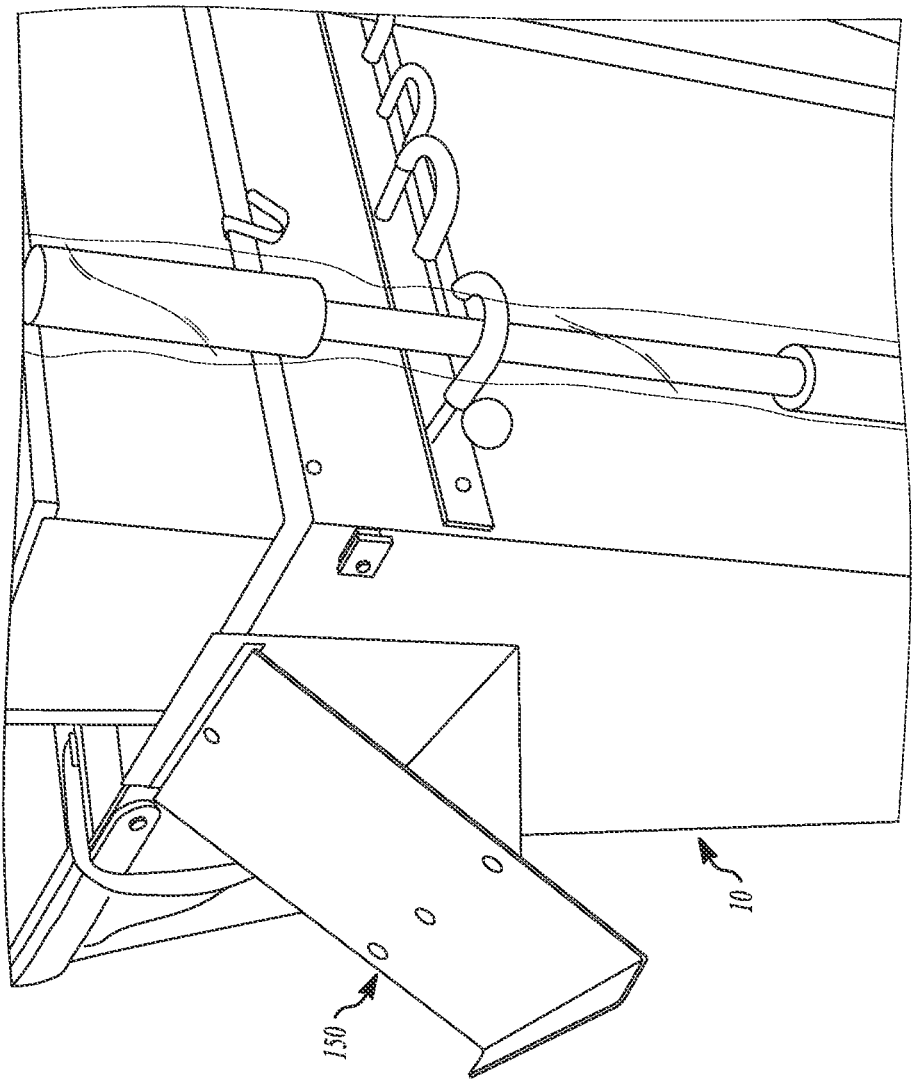
FIG. 25 is a side perspective view of the writing desk of FIG. 24.
Figure 26:
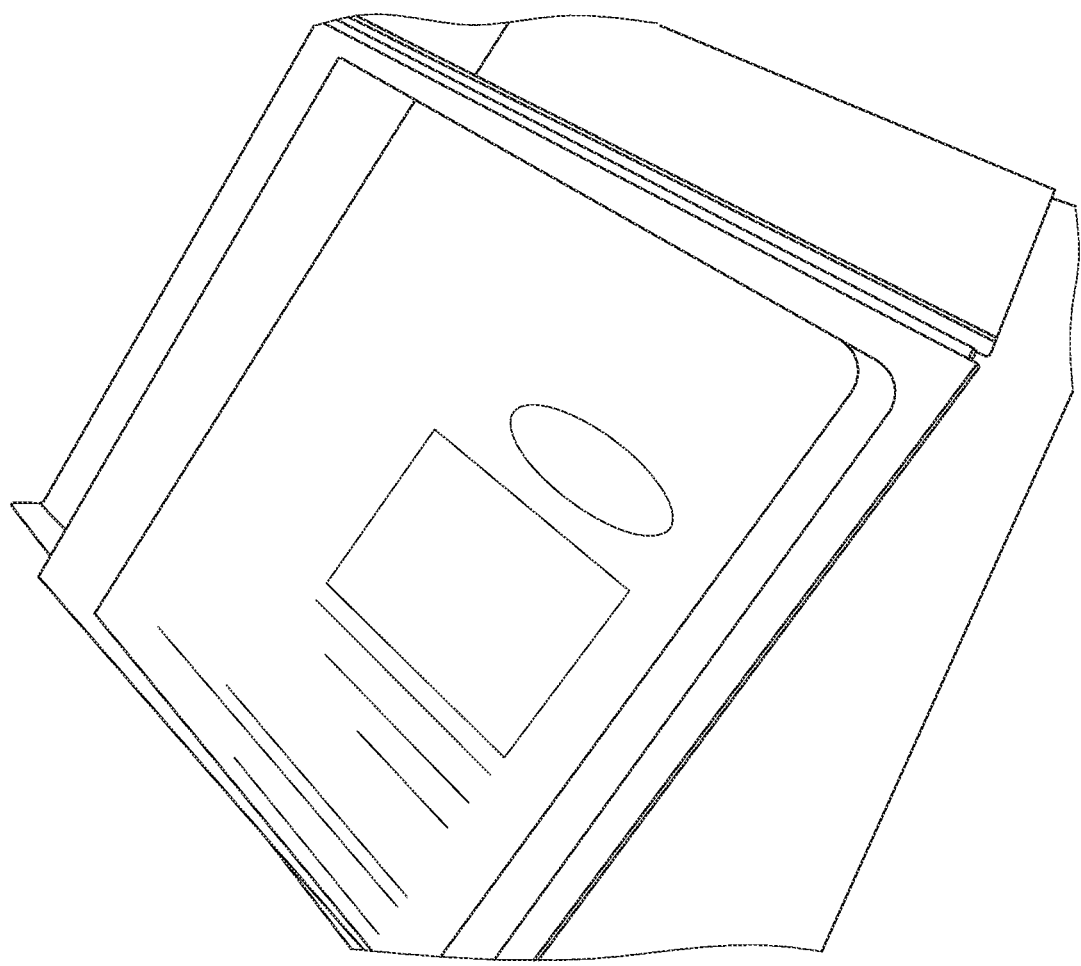
FIG. 26 is an upper view of the writing desk of FIG. 24 as disclosed herein with a user interface mounted thereon.
Figure 27:
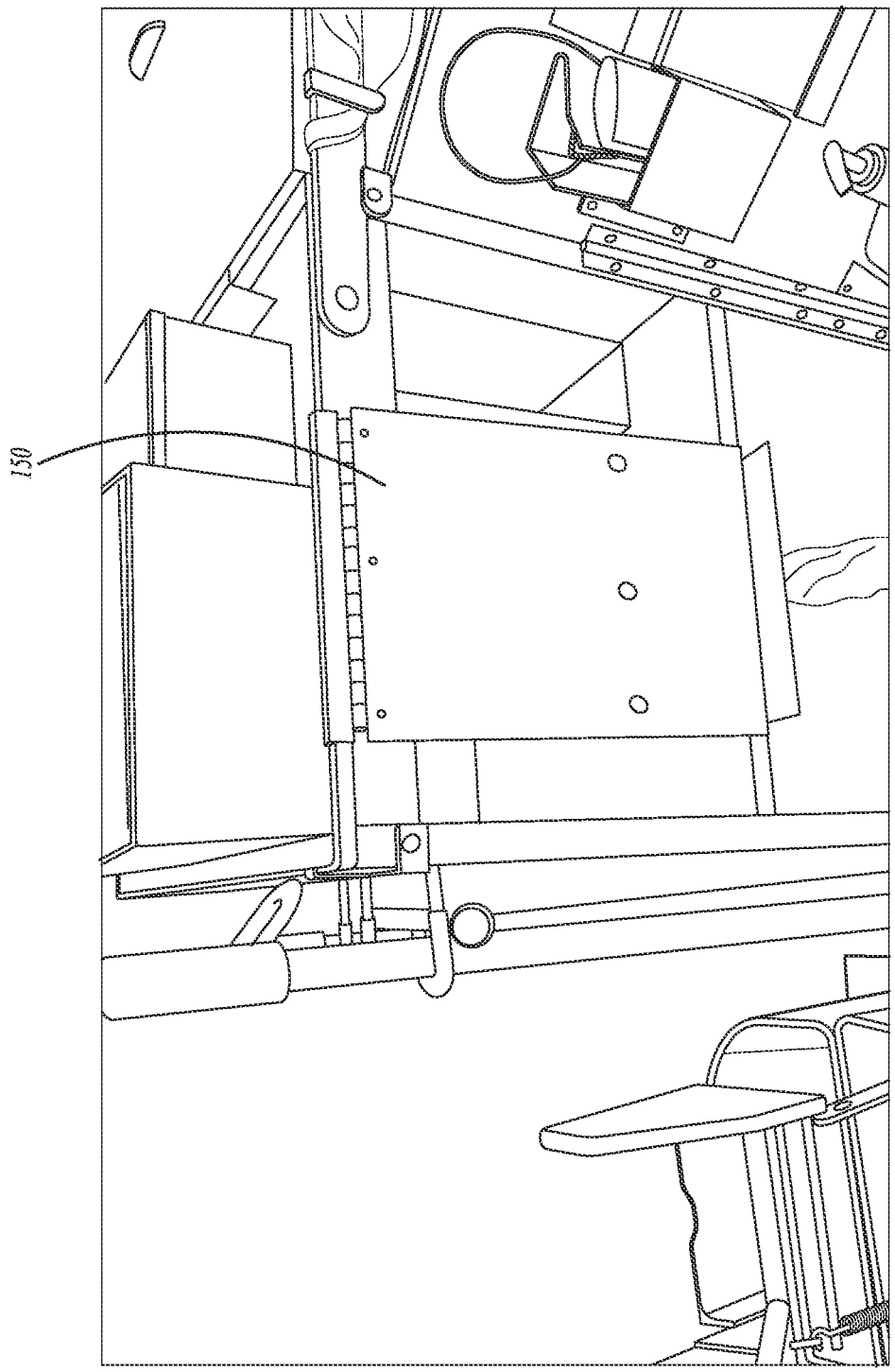
FIG. 27 is an alternate embodiment of the service desk as disclosed herein illustrating an alternate mounting mechanism.
Figure 28:
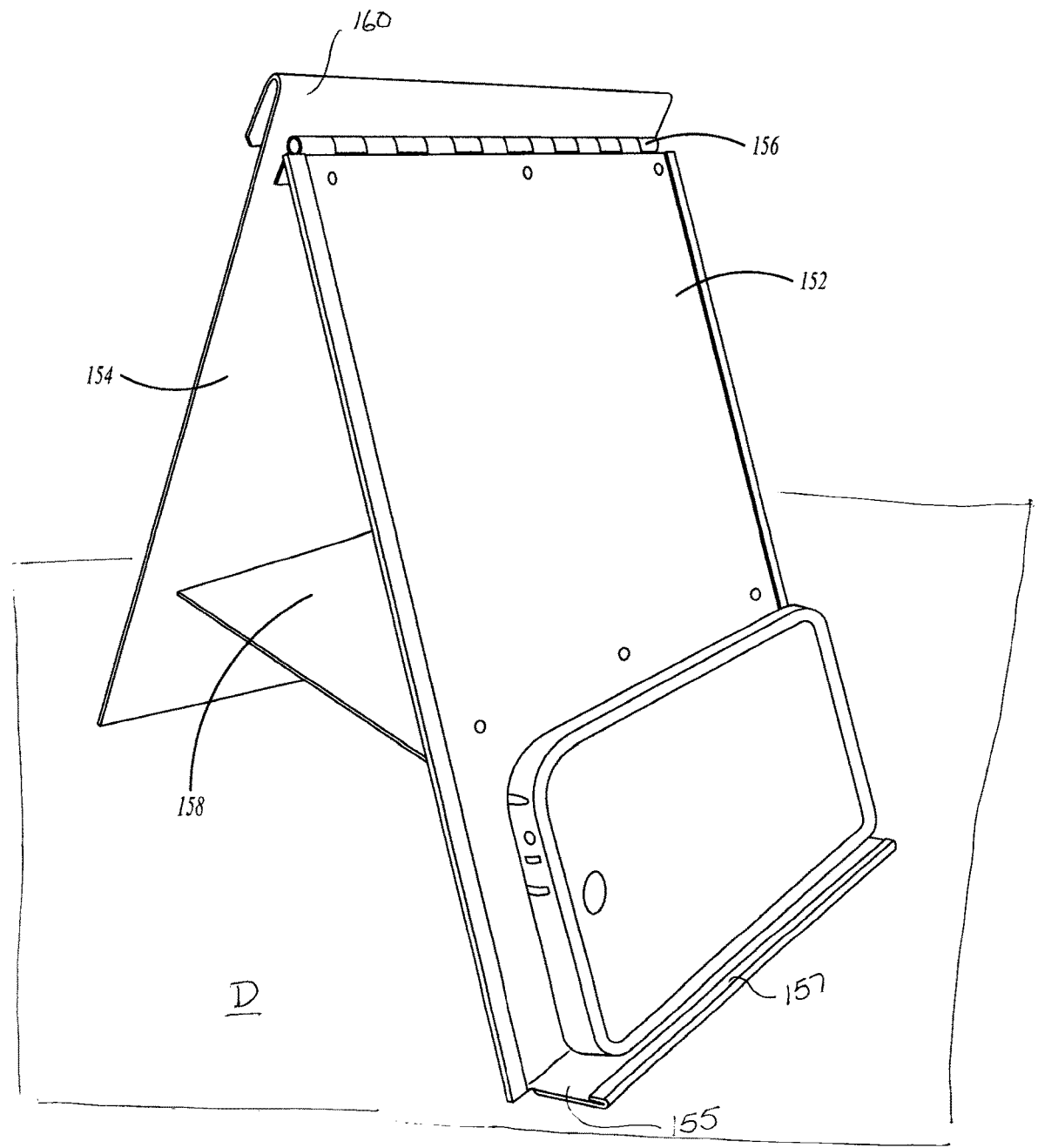
FIG. 28 is a perspective side view of a free-standing service desk as disclosed herein positioned on a surface such as desk D.
Figure 29:
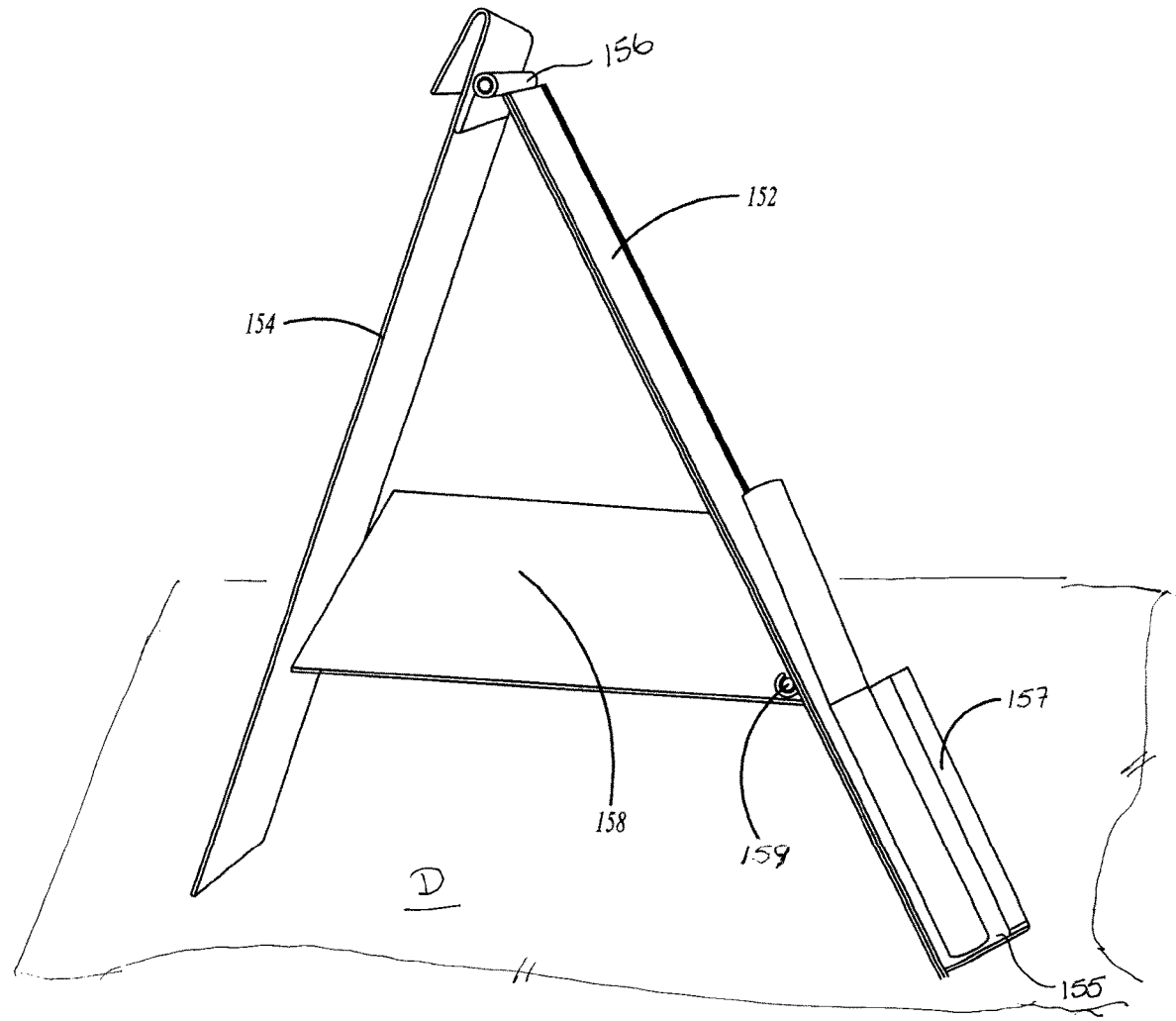
FIG. 29 is a detail view of the stabilizing strut of the service desk of FIG. 28.
Figure 30:
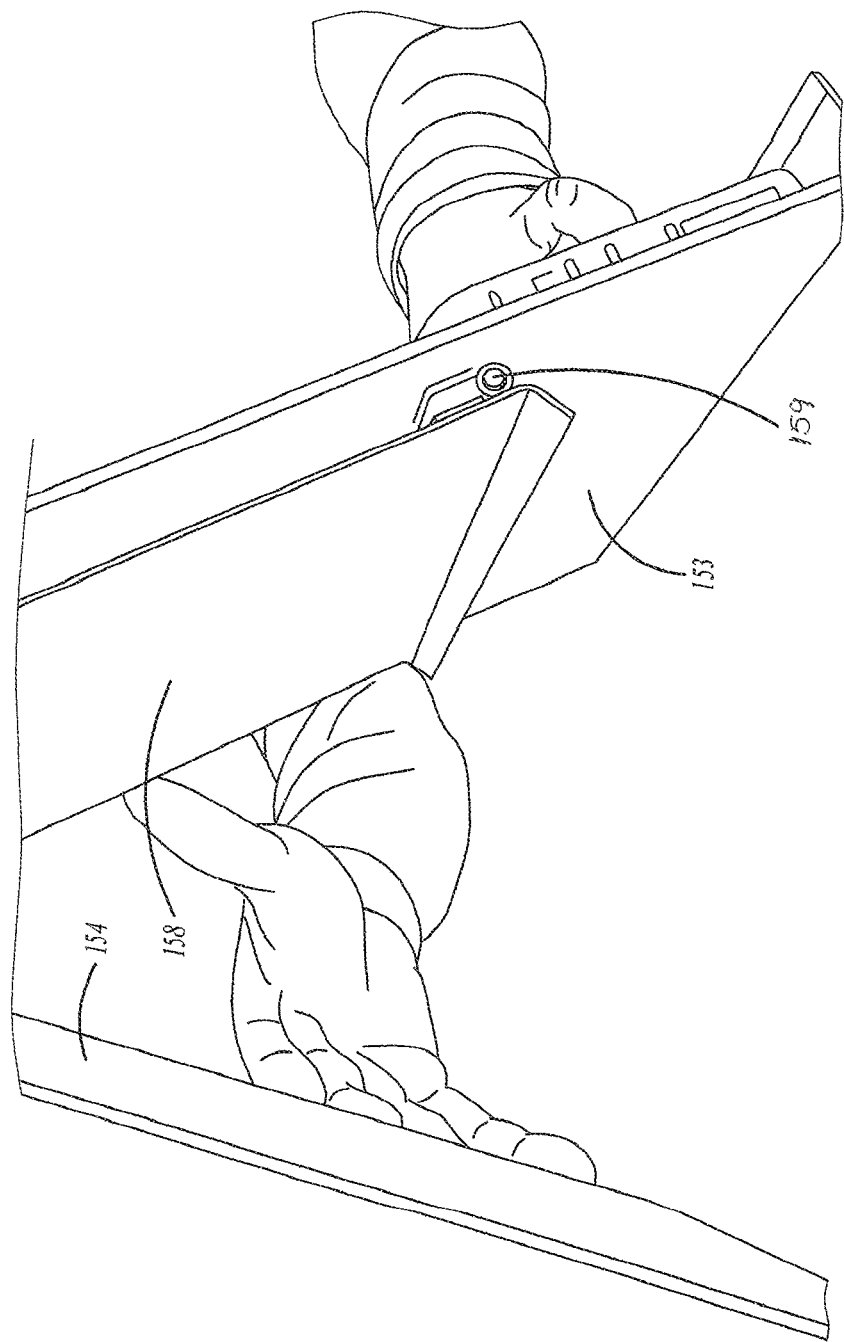
FIG. 30 is a detail view of the free-standing writing desk of FIG. 28 with the strut retracted.
Figure 31:
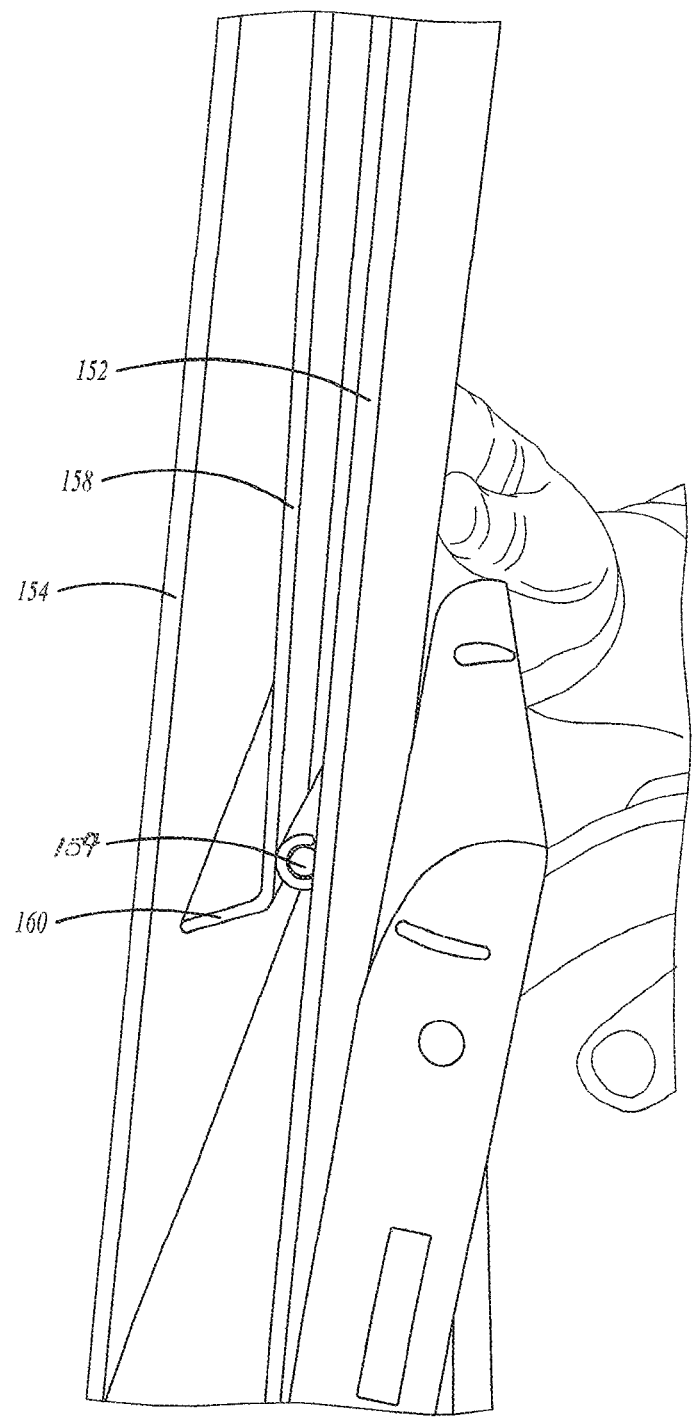
FIG. 31 is a detail view of the free-standing writing desk of FIG. 28 with the mounting support in the folded position.
Figure 32:
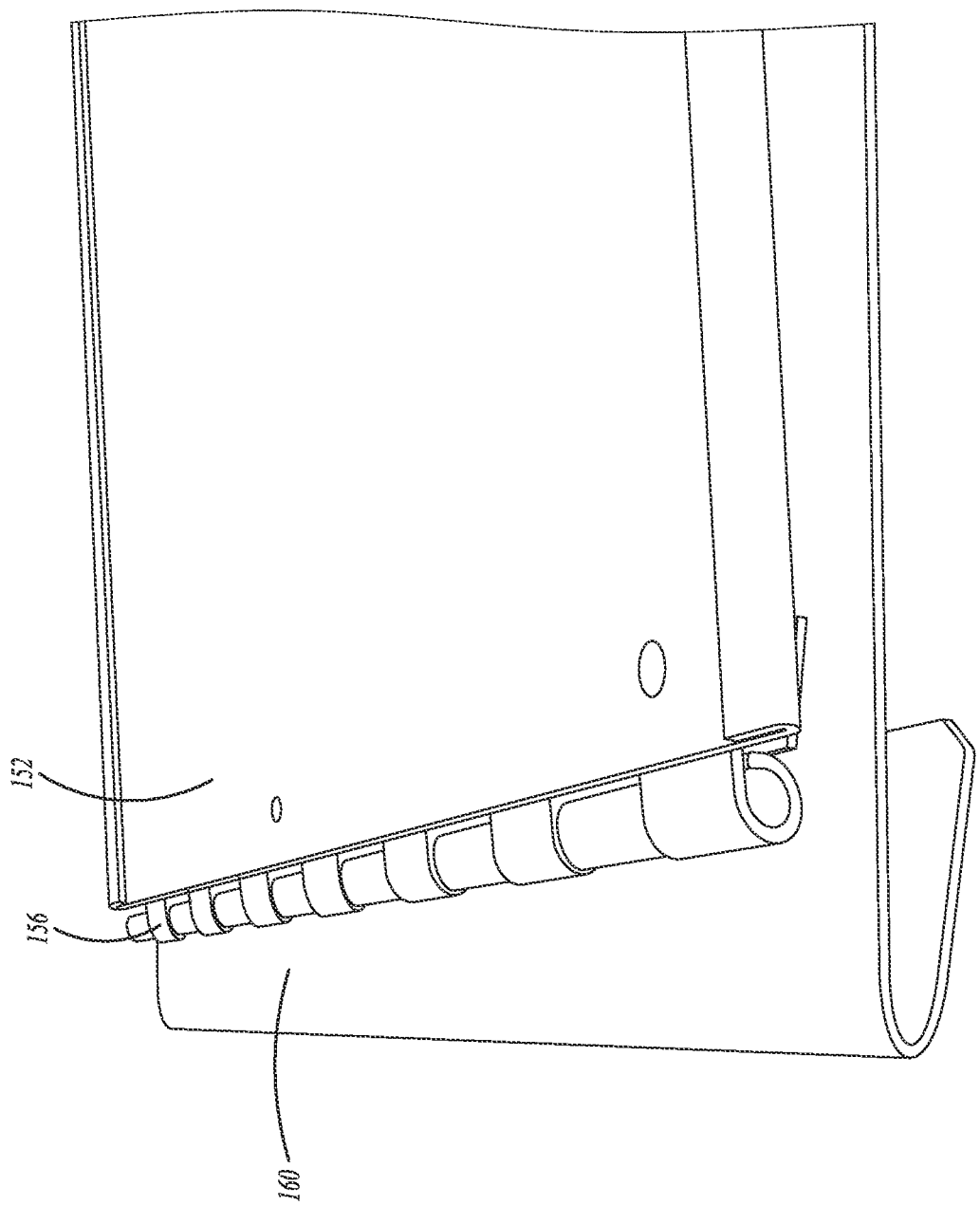
FIG. 32 is a detail view of the free-standing writing desk of FIG. 28 illustrating an embodiment of a hinge mechanism and mounting hook.
Figure 33:
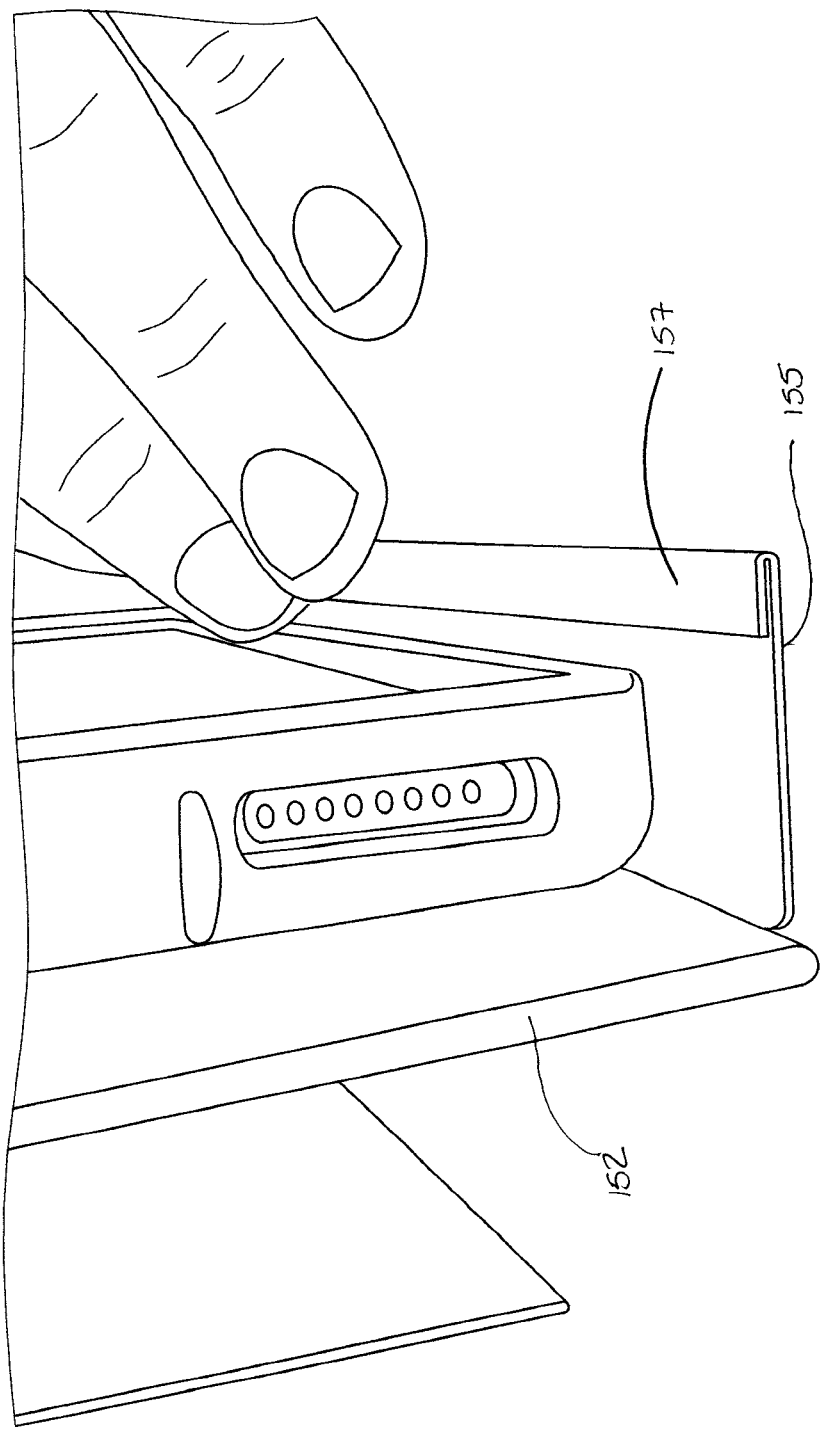
FIG. 33 is a detail view of an embodiment of the lower lip as disclosed herein.
Figure 34:
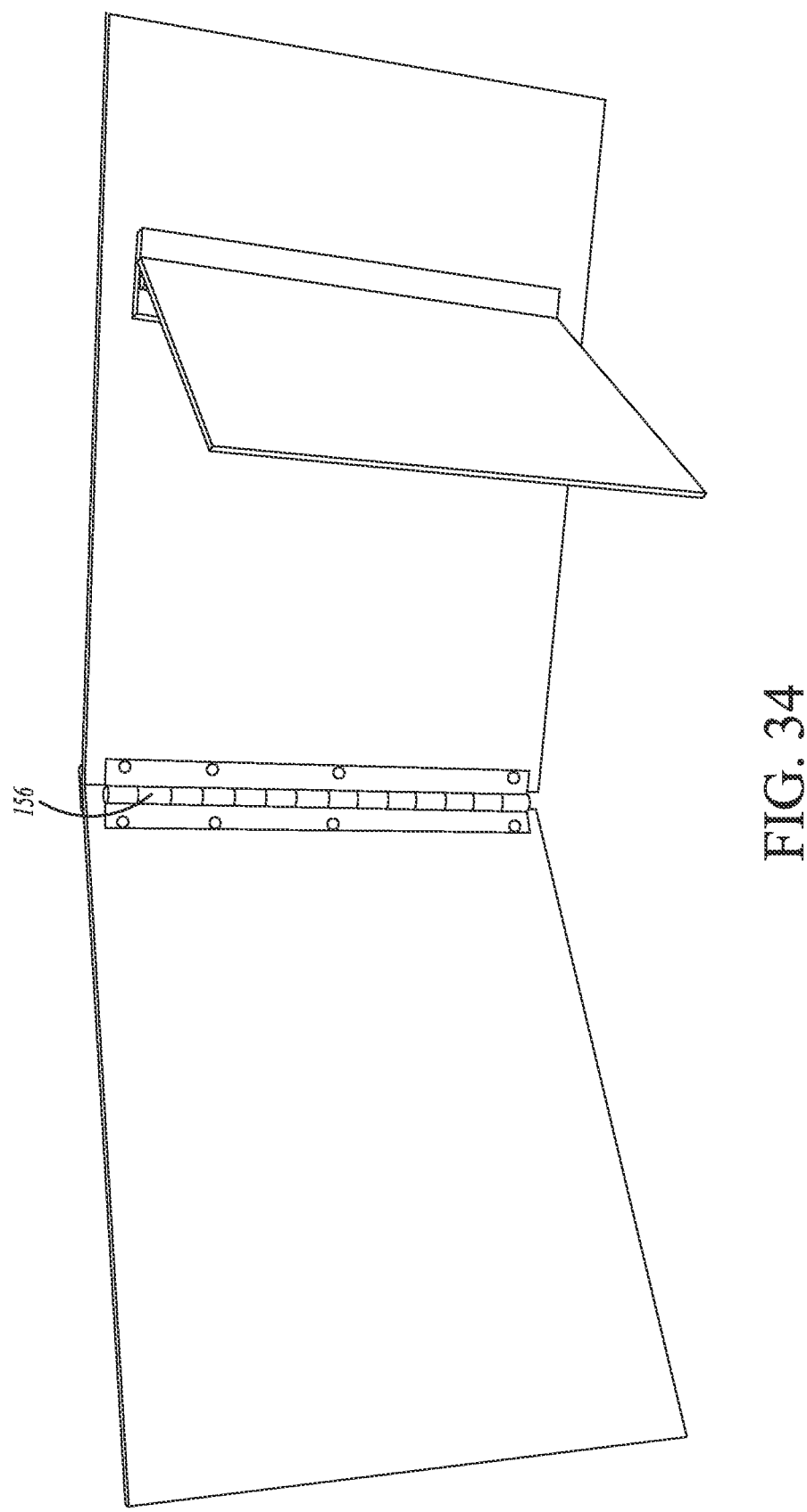
FIG. 34 is a rear view of the planar body and the rear support as well as the support strut.
Figure 35:
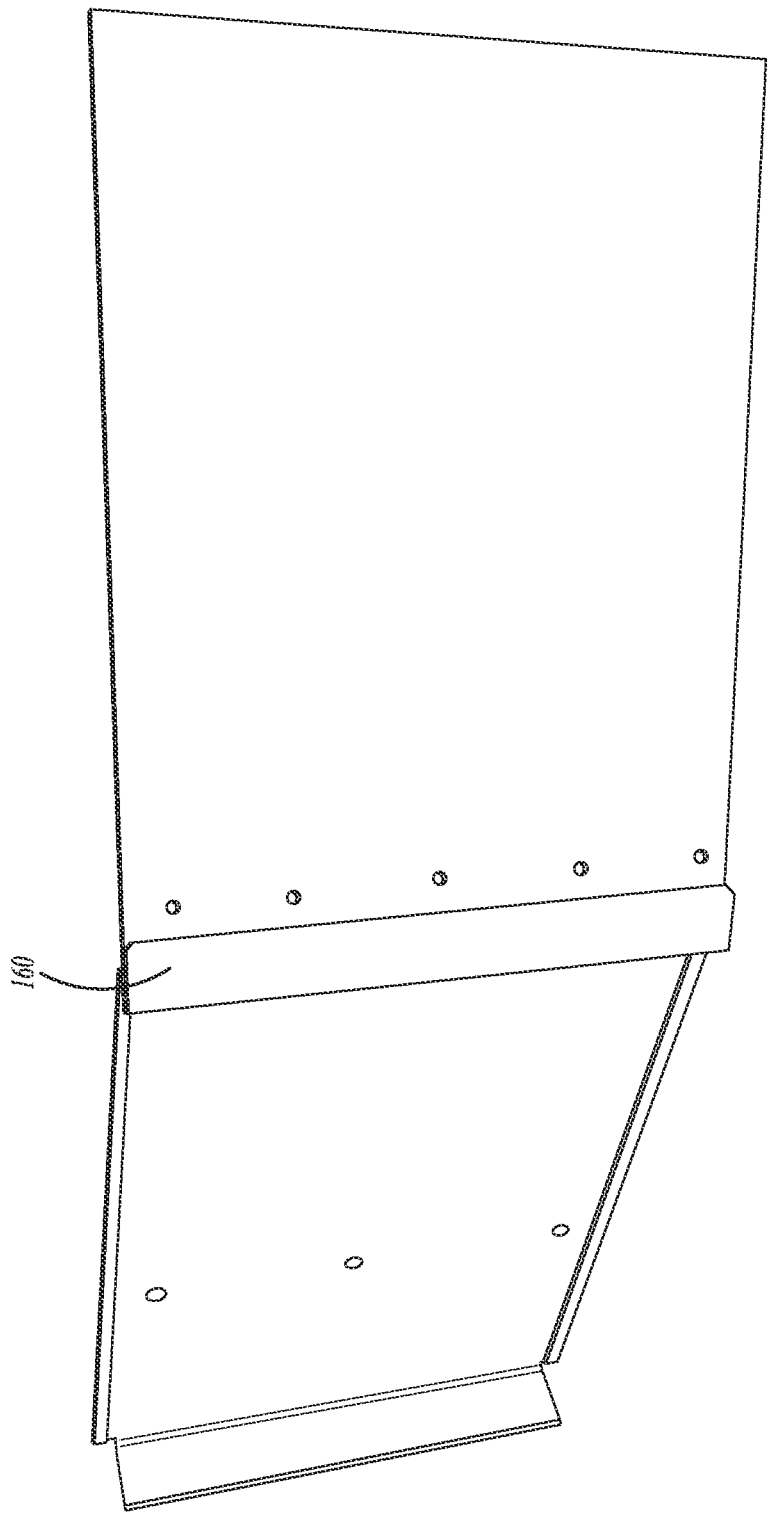
FIG. 35 is a detail of an embodiment of the mounting member as disclosed herein.

The moveable service cart 10 as disclosed herein can also include a removable slot container 200. The removable slot container 200 can be a rectangular member configured to be removably received within one of the receptacles defined in the inner cavity of the central storage housing 18 as illustrated in FIGS. 8, 10 and 21A and B. In certain applications, it is contemplated that that the removable slot container will be employed to house cart specific items such as checklist items, interactive items and the like. It is also contemplated that the removable slot container could be used to house personal items carried by the worker to whom the moveable service cart is assigned.

Where desired or required, one or more components of the moveable service car 10 as disclosed herein can be made of a suitable sanitizable material such as stainless steel, or the like. In the embodiment depicted, all structural and functional components with the exception of tire members and bump strips are composed of steel of stainless steel.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A service desk assembly comprising:
    a planar body having an outwardly oriented face and an opposed inwardly oriented face, the planar body having an upper edge and an opposed lower edge, the lower edge having a lower ledge member contiguously joined to the planar body at a location proximate to the lower edge and projecting angularly outward from the outwardly oriented face, the planar body having a planar body length $P_L$;
    a rear support having a first end and an opposed second end, the first end of the rear support pivotally connected to the upper edge of the planar body, the rear support having length $R_L$, wherein $R_L$ is equal to or less than $P_L$: and
    a central strut having a first end and an opposed second end, the first end of the central strut mounted to the service desk, the central strut extending between the rear support and the inwardly oriented face of the planar body at a central location, the opposed second end of the central strut having at least one engagement member defined thereon, the engagement member configured to releasably contact the inwardly oriented face of the planar member.

2. The service desk of claim 1 wherein the lower ledge projects outward at a right angle to the outwardly oriented planar face.

3. The service desk of claim 1 wherein the planar body has a width $P_w$, the rear support has a width $R_w$ and the central strut has a width $C_w$, wherein $R_w$ is equal to or greater than $P_w$.

4. The service desk of claim 1 further comprising at least one desk assembly elongate hook member, the at least one desk assembly elongate hook member projecting upward from a location proximate to the pivotal connection between the planar body and the rear support.

5. The service desk of claim 4 wherein the desk assembly elongate hook member is contiguous to the upper edge of the first end of the rear support.

6. The service desk of claim 1 wherein the planar body, rear support and at least one central strut are constructed from stainless steel.

7. A moveable service cart for transporting cleaning tools and equipment, the moveable service cart comprising:
    a base member, the base member having a length and a width wherein the width is less than the length, the base member having an upwardly oriented face and a downwardly oriented face when the moveable cart is in the use position;
    at least two wheel mechanisms connected to the base member and projecting downward from the downwardly oriented face;
    a central storage housing connected to the base, the central storage housing having a central storage housing width that is equal to or less than the base member width and a central storage housing length that is less than the base member length and a central storage housing height that is equal to or greater than width of the base member, the central storage housing defining a central storage cavity and having a top face parallel to the base member, a rear wall and opposed side walls and at least one access door, the access door opposed to the rear wall and moveable between a closed position and at least one open position, wherein the central storage housing has at least one equipment receptacle defined in the access door projecting into the central cavity when the access door is in a closed position and at least one equipment receptacle defined in the central storage cavity; and the service desk of claim 1.

8. The moveable service cart of claim 7 for transporting cleaning tools further comprising:

at least one fluid charging station defined on the top face of the central storage housing.

9. The moveable service cart of claim 7 further comprising at least one waste receptacle mounting unit, the waste receptacle mounting unit pivotally extendable from a location defined proximate to the top face of the central storage housing and pivotal between a use position projecting outward from one of the side faces of the storage unit to a storage position location overlying the top face of the central storage unit.

10. The moveable service cart of claim 9 wherein the base member is comprised of a first segment and a second segment, the second segment moveable relative to the first segment, wherein the central storage housing is connected to the first segment of the base member and the second segment pivots laterally between a first use position in which the second segment extends outward from the first segment and a second position in which a distal end of the second segment is proximate to the side of the central storage housing.

11. The moveable service cart of claim 10 wherein the second segment of the base member includes at least one second segment wheel mechanism.

12. The moveable service cart of claim 11 further comprising at least one mop bucket removably positionable on the second segment of the base member.

13. The moveable service cart of claim 7 further comprising at least one retaining lip located along at least a portion of a periphery defined on the top surface of the central storage housing and extending perpendicularly upward therefrom.

14. The moveable service cart of claim 7 wherein the service desk is removably connected to the central storage housing, the service desk having a central planar member, the service desk pivotally mounted relative to the central housing such that the central planar member is parallel to the side wall of the central storage housing in the non-use position and projects angularly from the central housing when in a use position.

15. The moveable service cart of claim 7 wherein the access door of the central storage housing comprises at least one lower equipment receptacle and at least one upper equipment receptacle, the at least one lower equipment receptacle comprising side members connected to the inner face of the access door, a lower floor member connected to the inner face of the access door and to the side members, the side members and floor member projecting outward therefrom and an outer face plate connected to the side members at a spaced distance from the inner face of the access door, the side walls and face plate defining a lower receptacle inner cavity, the lower receptacle having a side aperture defined in the outer face plate and at least one upper aperture.

16. The moveable service cart of claim 15 wherein the at least one lower receptacle is composed of three rectangular members positioned in spaced relationship with one another.

\* \* \* \* \*